Figure 3:
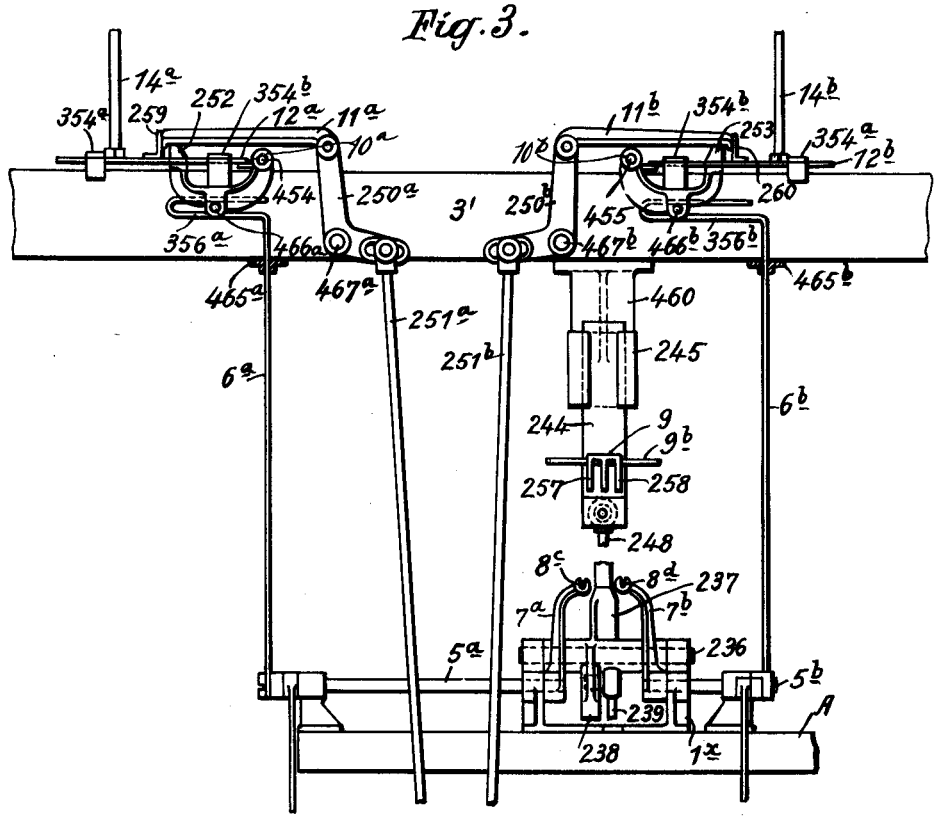

O. HESSER.
PACKING MACHINE.
APPLICATION FILED APR. 27, 1912.
1,106,303.
Patented Aug. 4, 1914.
19 SHEETS—SHEET 1.
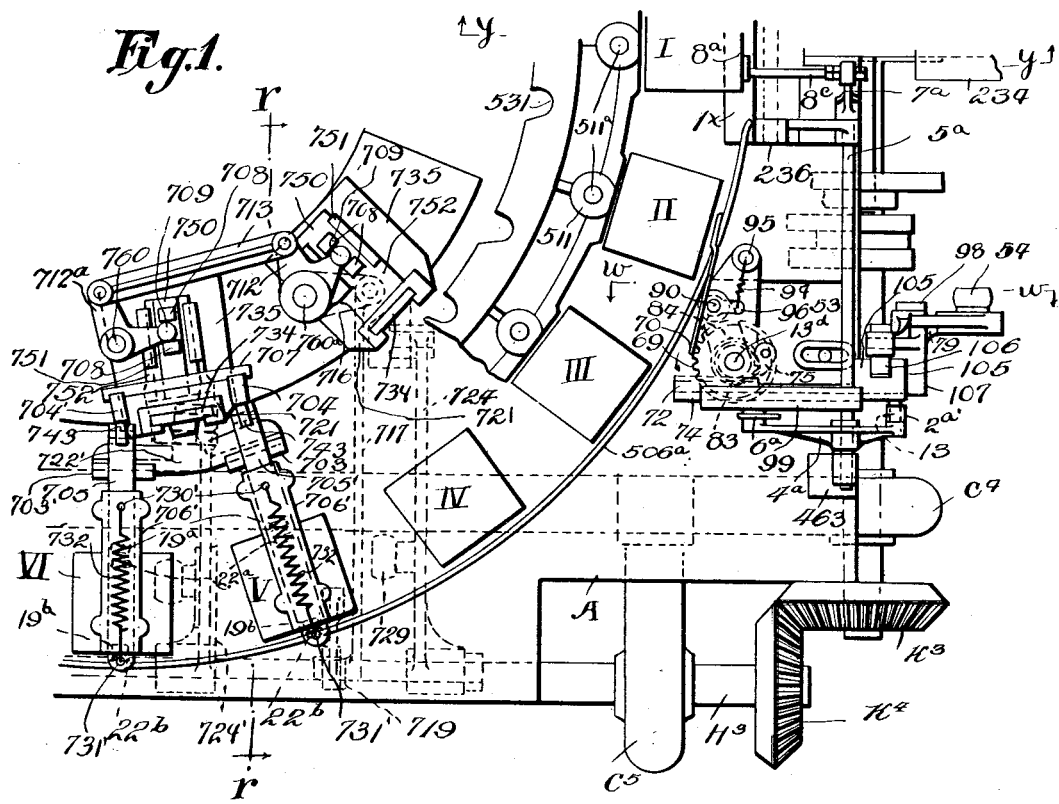
Witnesses:
Bertha David
Horace A. Crossman
Inventor:
Otto Hesser:
by Emery, Booth, Janney & Varney,
Attys

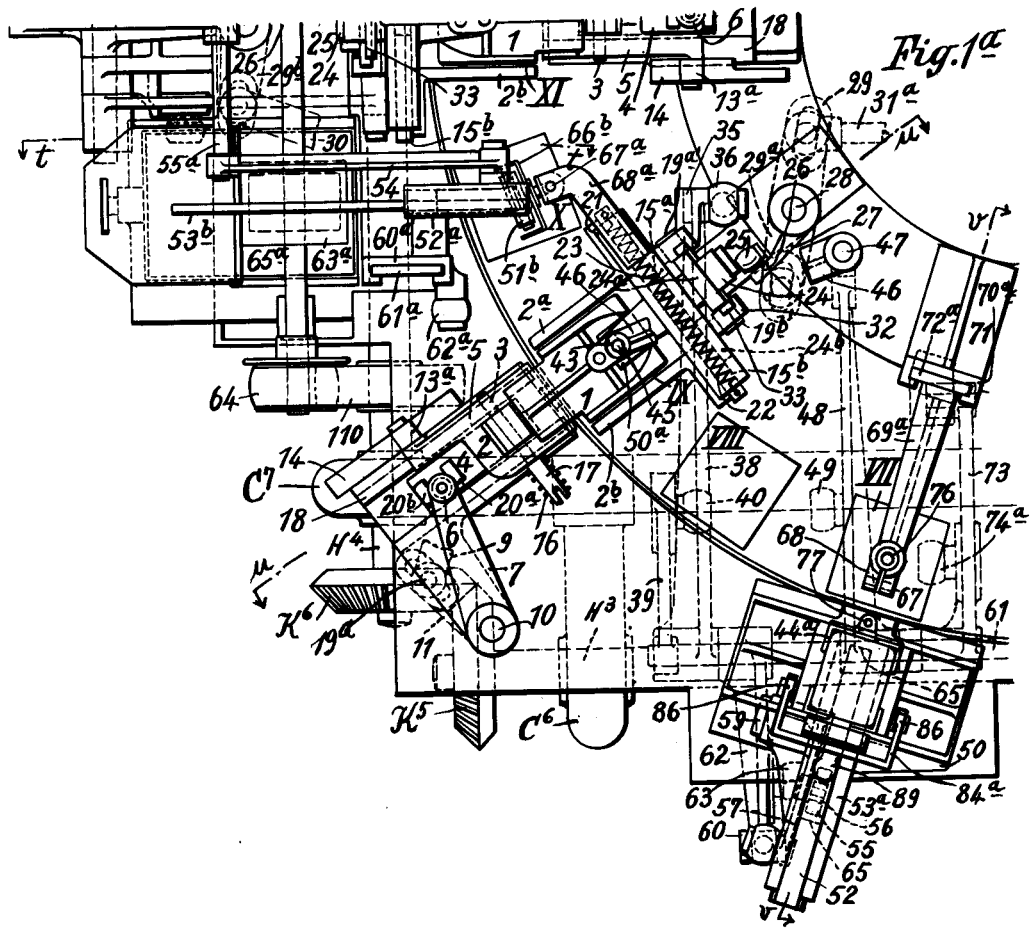

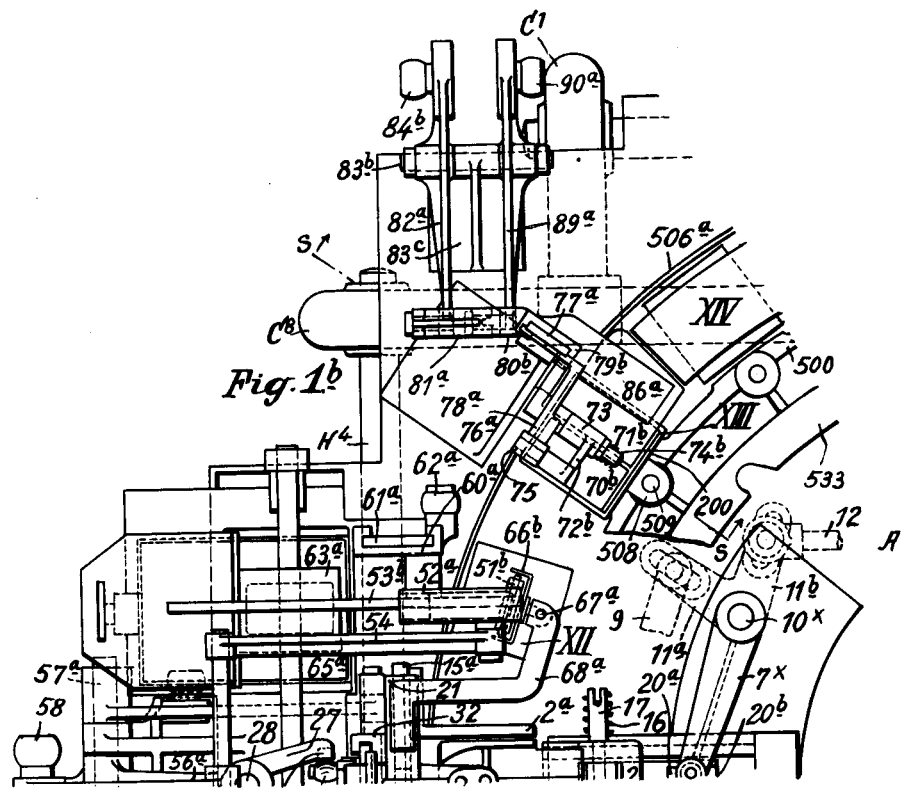

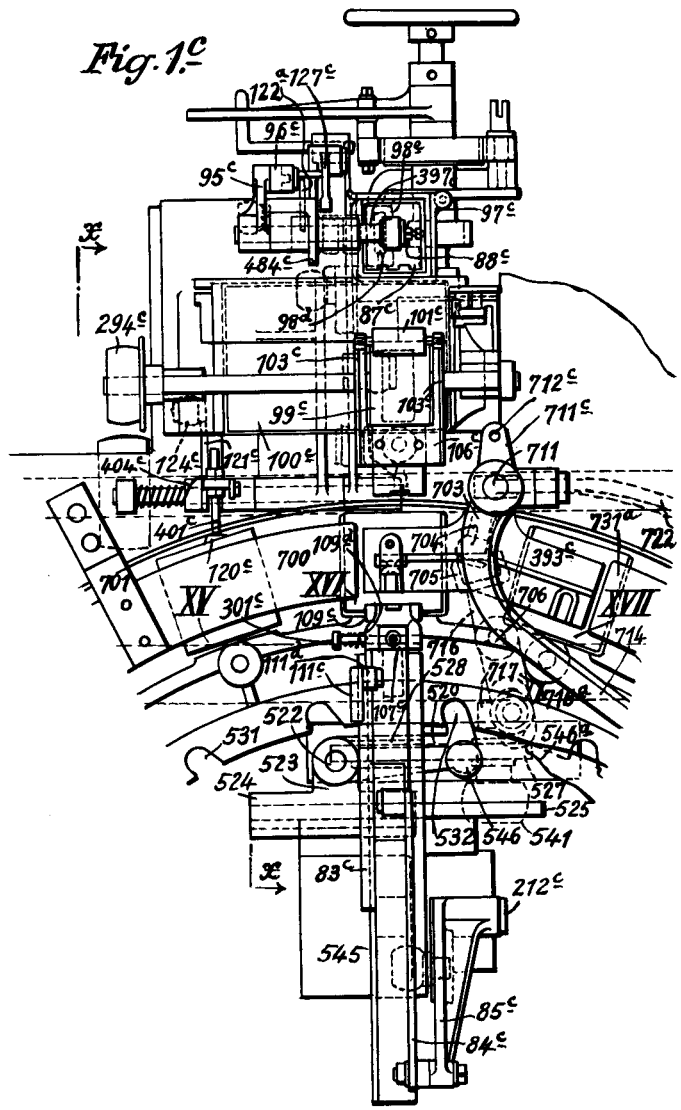

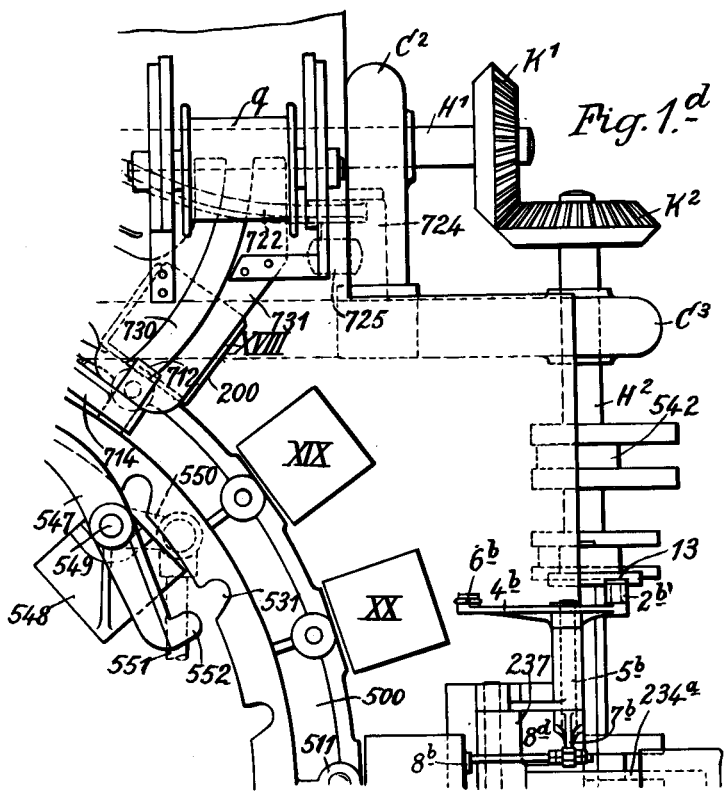

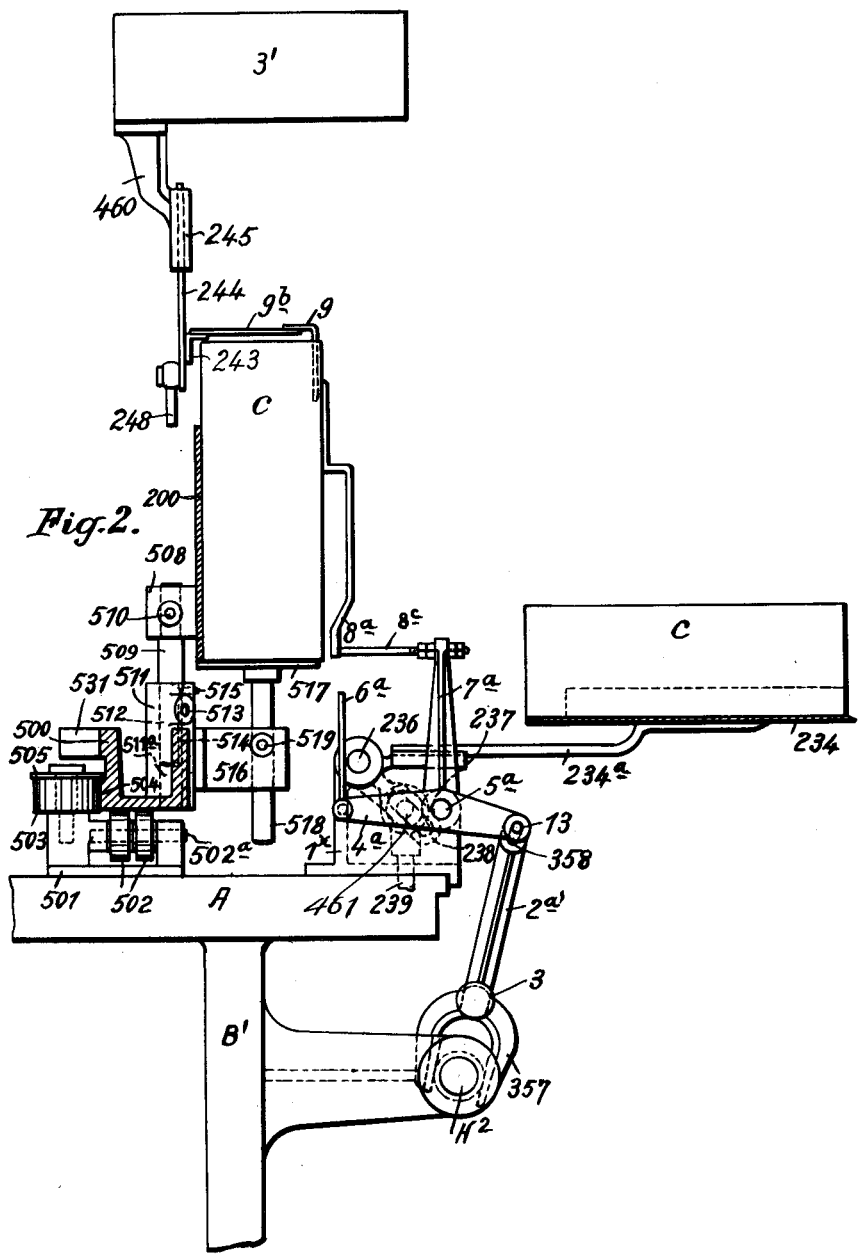

O. HESSER.
PACKING MACHINE.
APPLICATION FILED APR. 27, 1912.

1,106,303.

Patented Aug. 4, 1914.

19 SHEETS—SHEET 9.

Witnesses:
Horace A. Crossman
Carl L. Choate

Inventor:
Otto Hesser,
by Emery, Booth, Janney & Varney
Attys.

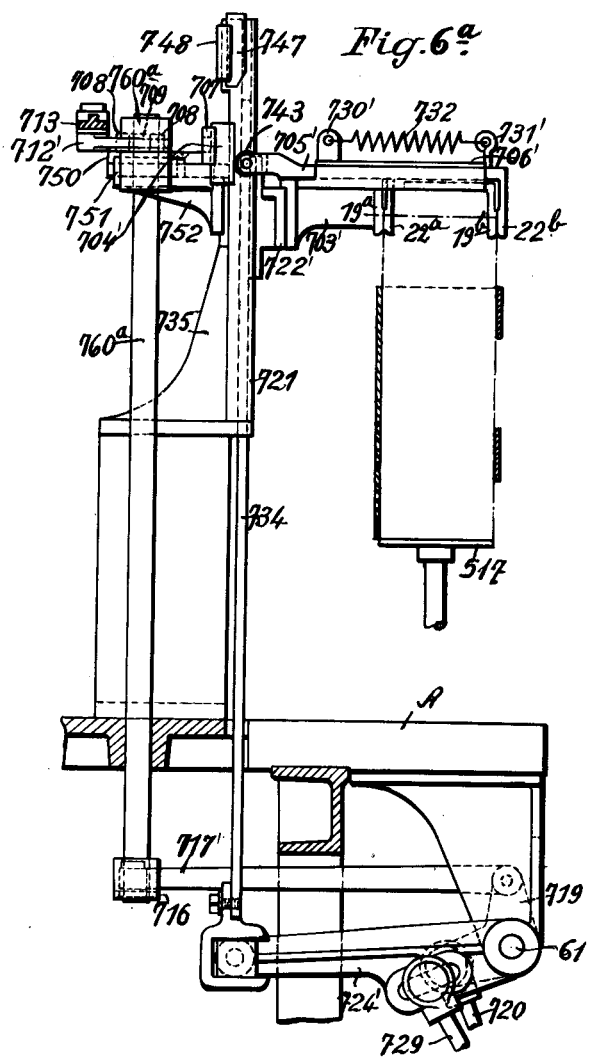

O. HESSER.
PACKING MACHINE.
APPLICATION FILED APR. 27, 1912.

1,106,303.

Patented Aug. 4, 1914.

19 SHEETS—SHEET 11.

Witnesses:
Horace A. Croseman
Carl L. Choate

Inventor:
Otto Hesser,
by Emery Booth Janney Varney
Attys

O. HESSER.
PACKING MACHINE.
APPLICATION FILED APR. 27, 1912.
1,106,303.
Patented Aug. 4, 1914.
19 SHEETS—SHEET 12.
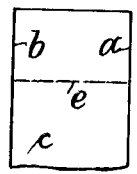 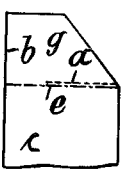 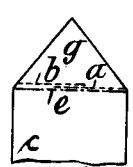 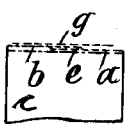 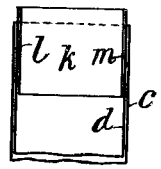
Fig. 9.  Fig. 10.  Fig. 11.  Fig. 12.  Fig. 13.
 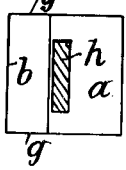 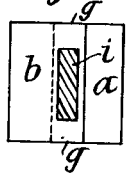 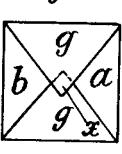 
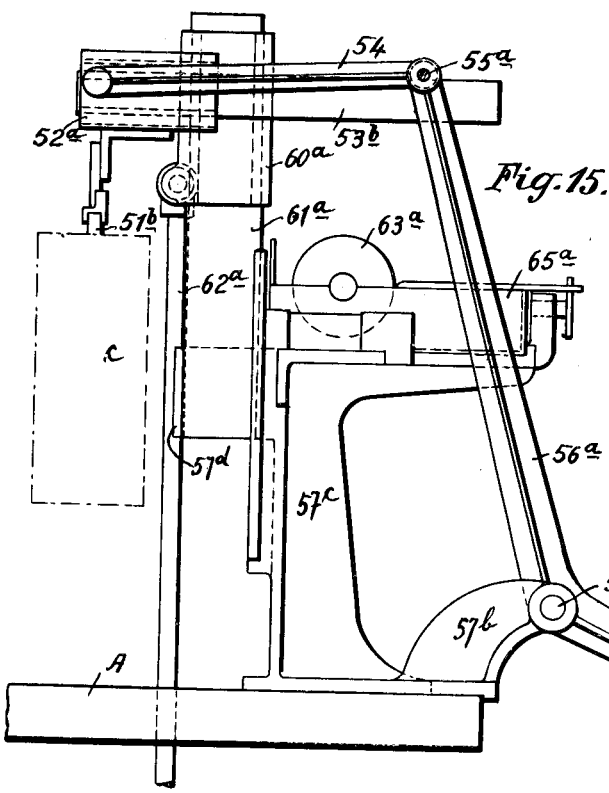
Fig. 15.
Witnesses:
Horace A. Groseman
Carl L. Choate
Inventor:
Otto Hesser,
by Emery Booth Janney & Varney
Attys

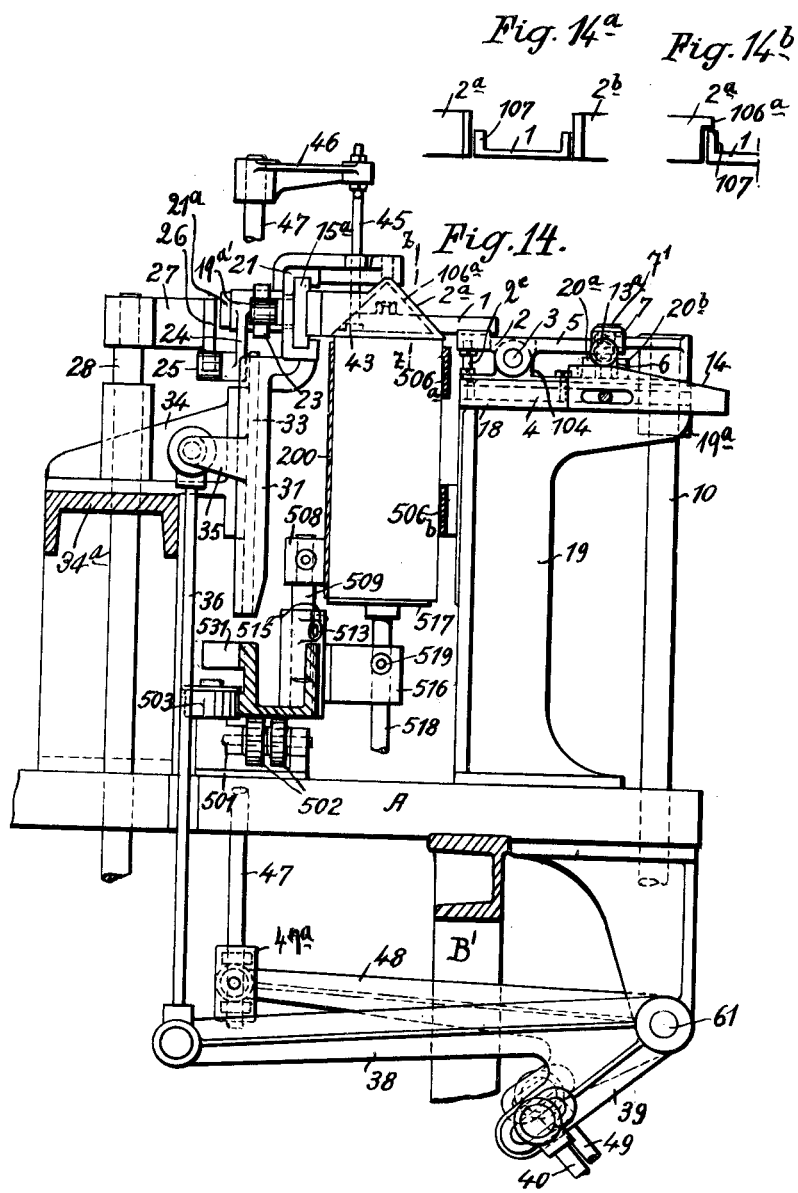

O. HESSER.
PACKING MACHINE.
APPLICATION FILED APR. 27, 1912.

1,106,303.

Patented Aug. 4, 1914.
19 SHEETS—SHEET 14.

Witnesses:
Horace A. Crossman
Carl L. Choate

Inventor:
Otto Hesser,
by Emery, Booth, Janney & Varney
Attys

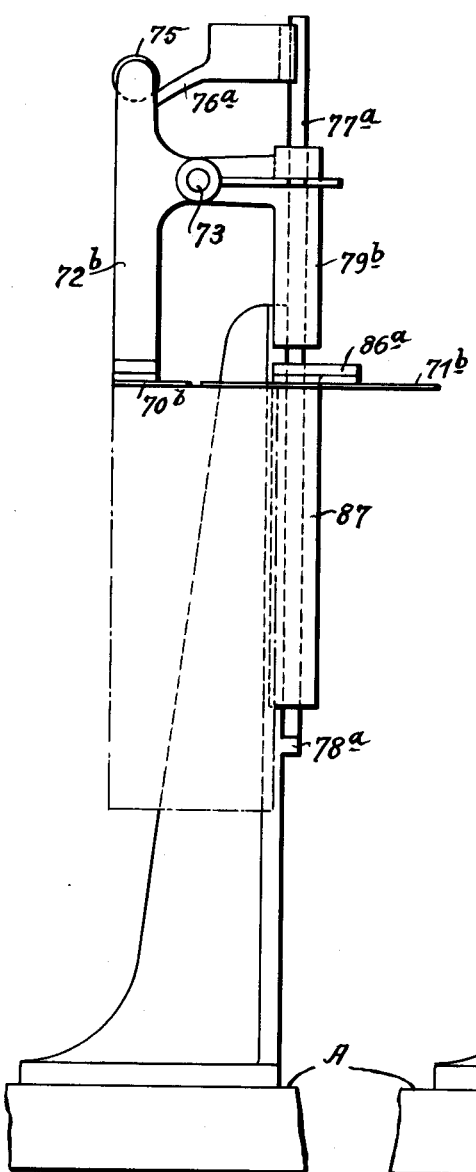
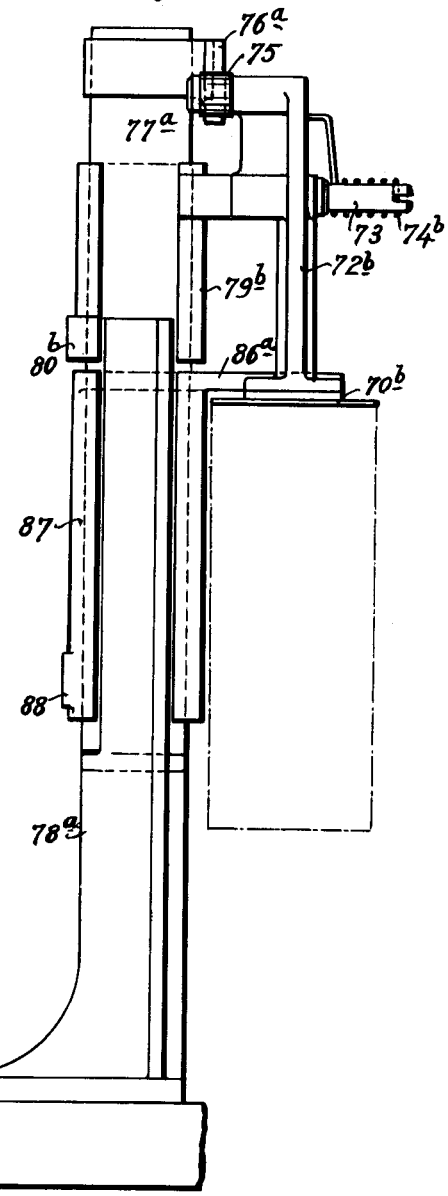

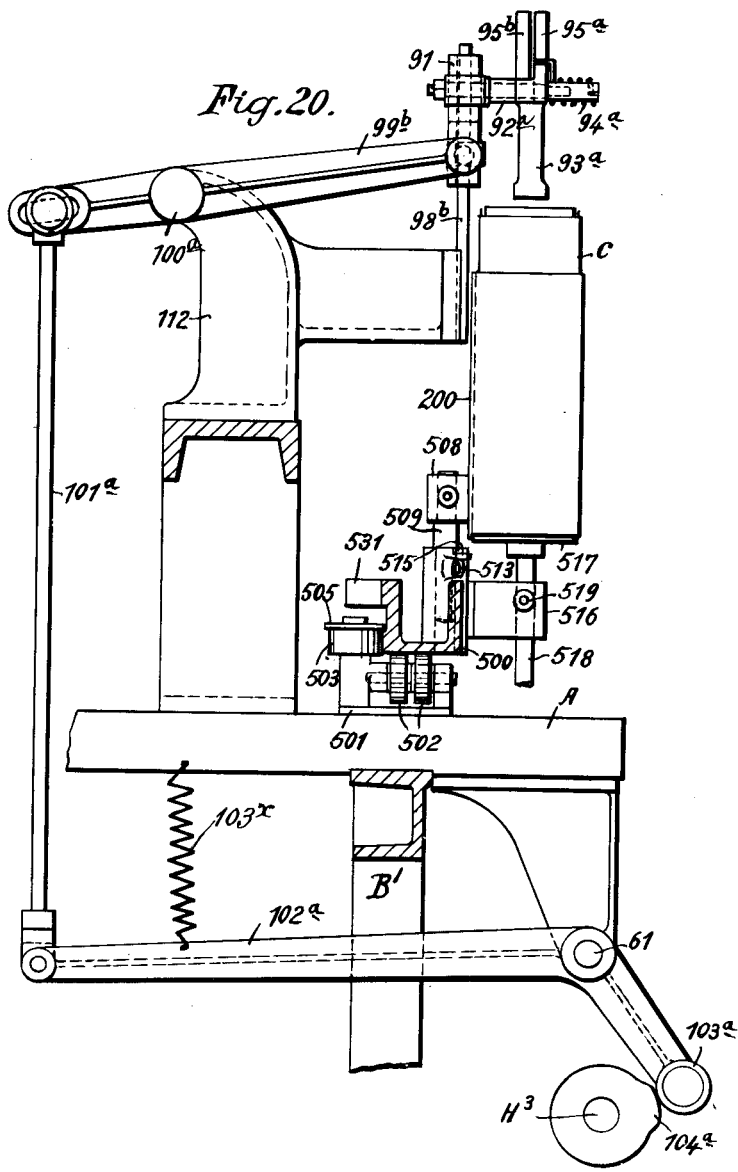

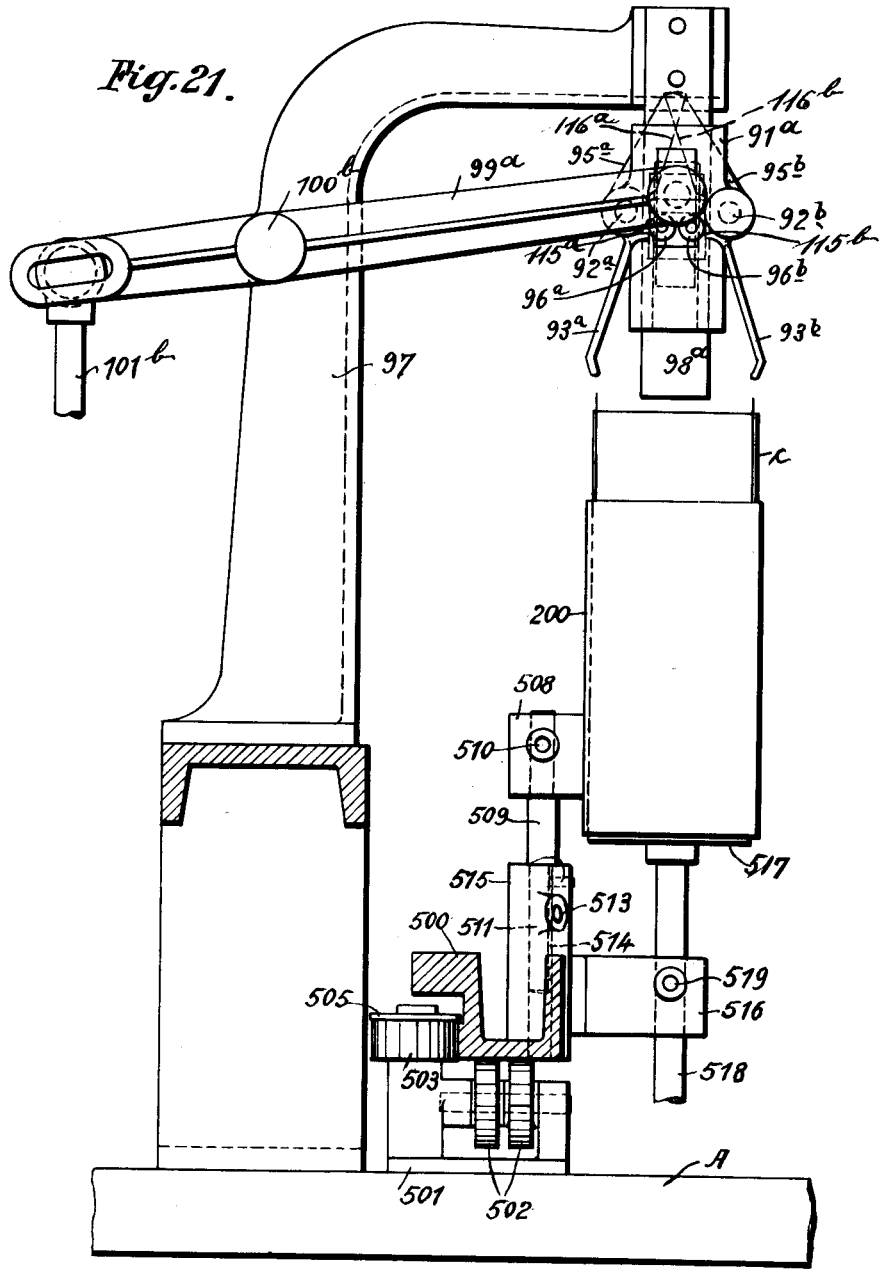

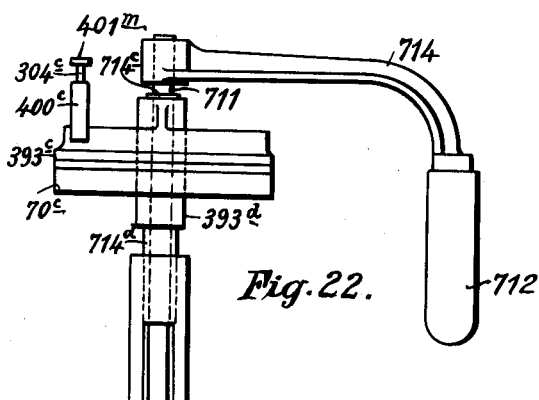
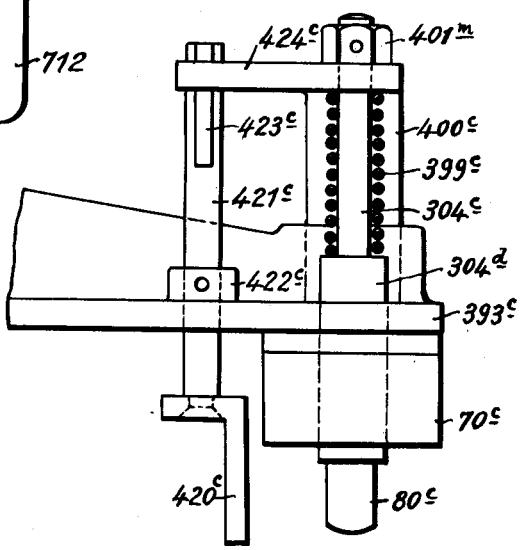
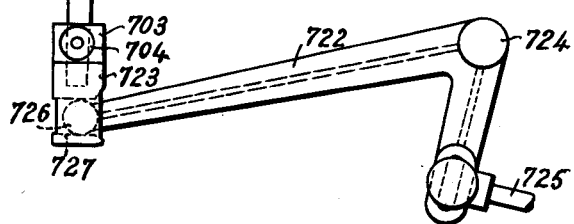

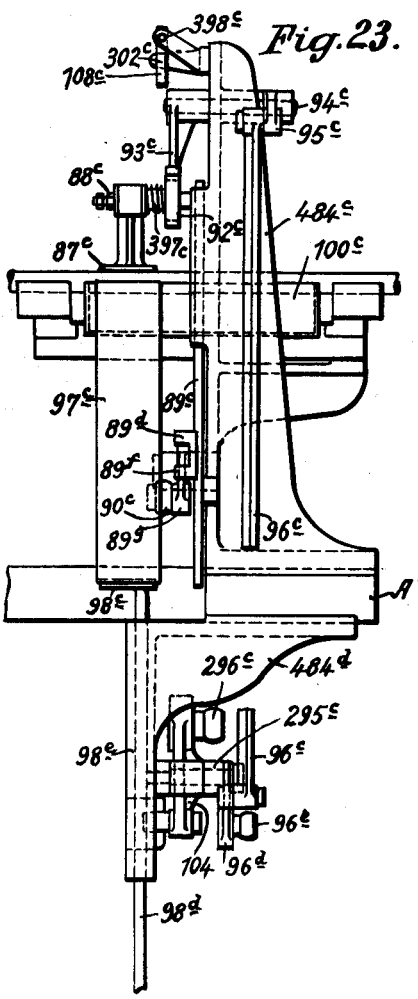

UNITED STATES PATENT OFFICE.

OTTO HESSER, OF CANNSTATT, NEAR STUTTGART, GERMANY, ASSIGNOR TO THE FIRM OF FR. HESSER MASCHINENFABRIK AKTIENGESELLSCHAFT, OF CANNSTATT, NEAR STUTTGART, GERMANY.

PACKING-MACHINE.

1,106,303.  Specification of Letters Patent.  Patented Aug. 4, 1914.

Application filed April 27, 1912. Serial No. 693,637.

*To all whom it may concern:*

Be it known that I, OTTO HESSER, a subject of the German Emperor, and residing at Cannstatt, near Stuttgart, Germany, have invented certain new and useful Improvements in or Relating to Packing-Machines, of which the following is a specification.

My invention relates to machines for automatically charging packets with goods of any kind, such as coffee, tea, cocoa, etc., and for automatically closing the so charged packets. Machines of this type are known in which the packets are received by transporting vessels which feed them to several stations on which are provided means for introducing weighed charge of wares from automatic weighing apparatus in the packets, means for shaking the packets so as to cause the contents to settle, means for inserting a card such as an advertising card in the packets, means for gumming and folding the upper edges of the packets, means for pressing the folded flaps, means for applying a closing label to them and means for ejecting the packets from the machine. There are also known machines of this type in which are provided means for having the packing machine coöperate with the machine for making the packets, and means for automatically rendering inactive the means for releasing the weighing apparatus, in case there is no packet in the respective transporting vessel.

My present invention relates to improvements in the aforesaid means which will be readily seen from the following specification in connection with the annexed drawings which illustrate a preferred form of my improved machine.

Figure 4:
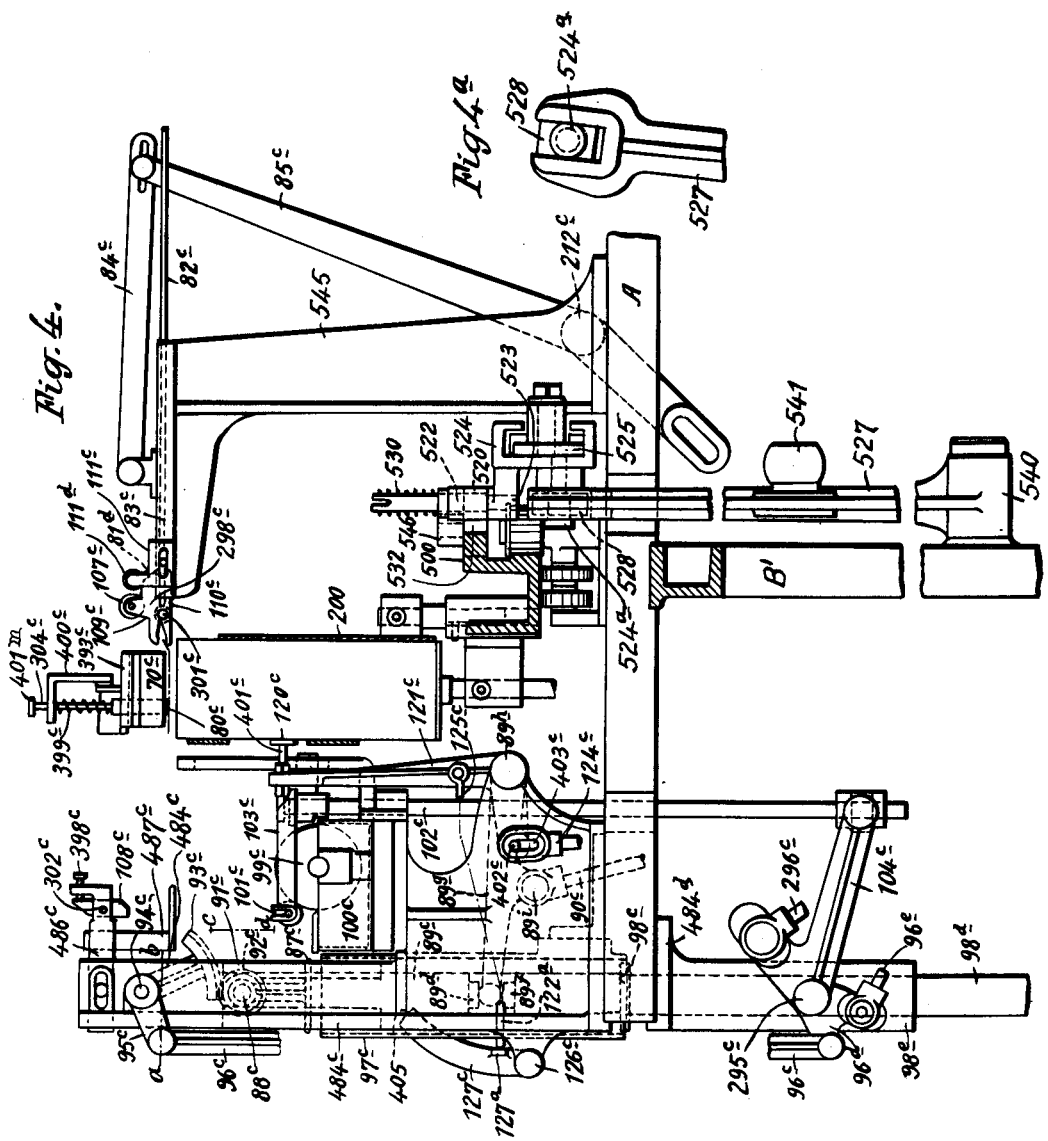
Figure 5:
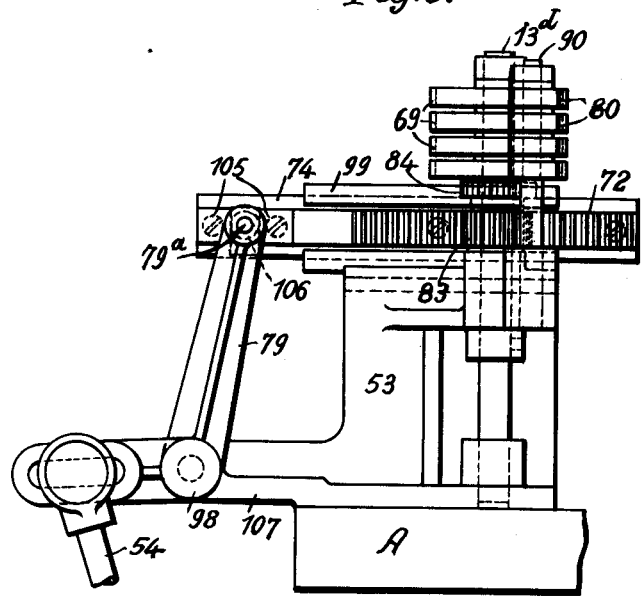
Figure 6:
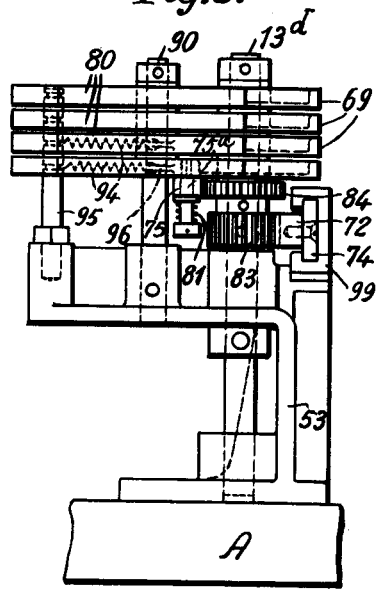
Figure 8:
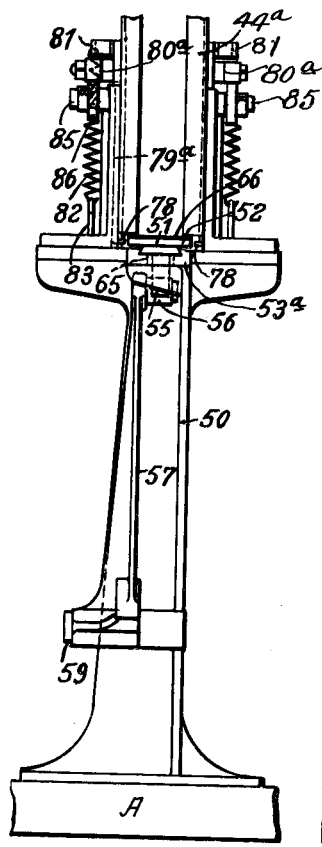
Figure 7:
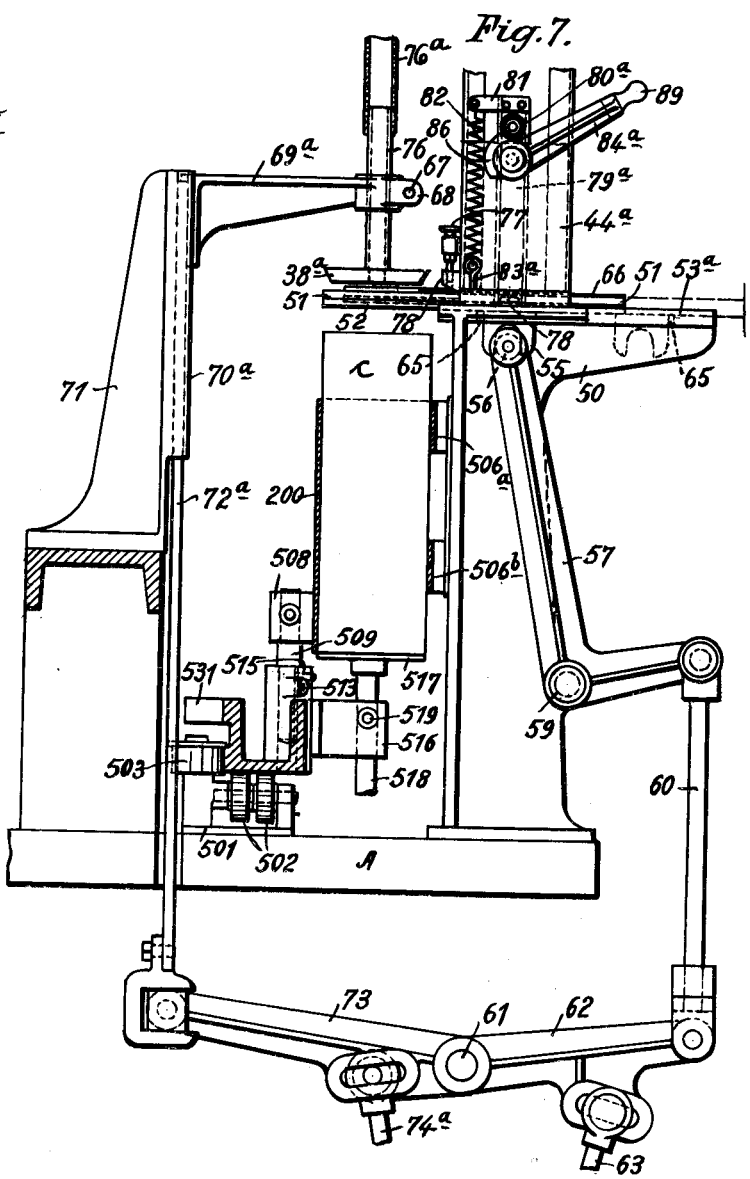
Figure 16:
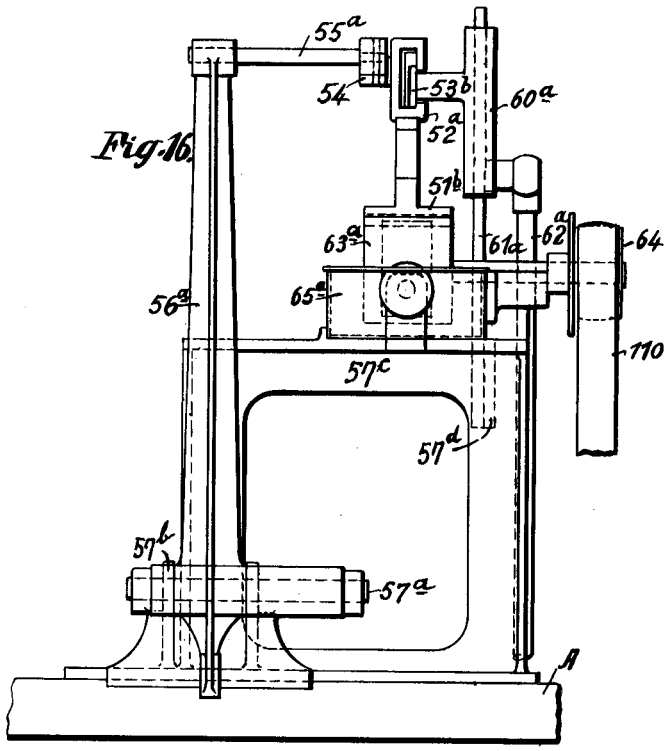
Figure 19:
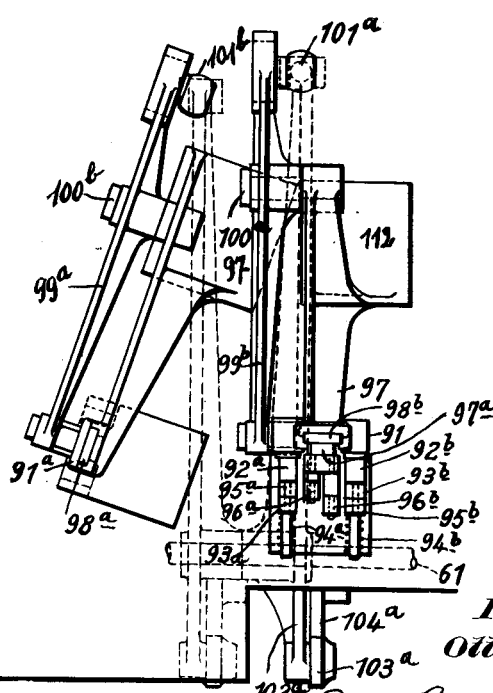

Figures 1, 1$^a$, 1$^b$, 1$^c$ and 1$^d$ show, when joined together, a plan view of the whole machine. Fig. 2 is a vertical radial section through the right part of the machine in Fig. 1 on the line $y$—$y$, seen in the direction of the arrows, and shows the device for inserting a packet in the transporting vessel. Fig. 3 is an end view of this device, when locked at from the right in Fig. 1, and further shows the device for releasing the weighing apparatus, Fig. 4 is a vertical radial section through the line $x$—$x$ in Fig. 1$^c$, seen in the direction of the arrows, and shows the devices for feeding the transporting vessels and for applying the closing label to the packet, Fig. 4$^a$ is a detail of this device, Fig. 5 is a vertical section through the line $w$—$w$ in Fig. 1, seen in the direction of the arrows, and shows in an elevation a shaking device for the station II in Fig. 1, Fig. 6 is a side view of the same, when looked at from left to right in Fig. 1, Fig. 6$^a$ is a vertical section through the line $r$—$r$ in Fig. 1, seen in the directon of the arrows, and shows in an elevation a shaking device for the stations III—VI, Fig. 7 is a vertical radial section through the line $v$—$v$ in Fig. 1$^a$, seen in the direction of the arrows, and shows the device for inserting an advertising card, Fig. 8 is an end view of the same, when looked at from below in Fig. 1$^a$, Figs. 9 to 13 represent the various steps of closing and gumming a packet in elevations above and in plan view below, Fig. 14 is a vertical radial section through the line $u$—$u$ in Fig. 1$^a$, seen in the direction of the arrows, and shows a folding device, Figs. 14$^a$ and 14$^b$ are details of this device, Fig. 15 is a vertical section through the line $t$—$t$ in Fig. 1$^a$, seen in the direction of the arrows, Fig. 16 is an end view of the same, when looked at from the left in Fig. 1$^a$, Fig. 17 is an end view of a folding device illustrated at Fig. 18, when looked at from the center of the machine in Fig. 1$^b$, Fig. 18 is a vertical section through the line $s$—$s$ in Fig. 1$^b$, seen in the direction of the arrows, Fig. 19 is a plan view of the stations VII and VIII in Fig. 1$^a$, after the device for inserting an advertising card has been removed and two devices for folding the upper flaps of the inner bag of a double packet have been disposed, Fig. 20 is an elevation of the folding device at the station VII in Fig. 19, when looked at from the ieft, Fig. 21 is an elevation of the folding device at the station VIII in Fig. 19, when looked at from the left, and Fig. 22 is a vertical section through the upper part in Figs 1$^{c\prime}$ and 1$^d$ and shows the ejecting device at the station XVIII, when looked at from below, Fig. 23 is an end view of the labeling device shown in Fig. 4, when looked at from above in Fig. 1$^c$, Fig. 24 illustrates a detail of the labeling device.

In the machine illustrated, a horizontal turnable ring 500 of a U-shaped cross section (Fig. 2) is disposed above the table A and is made to roll over several radial series of vertical rollers 502 mounted to turn on pins 502ª in suitable bearings 501. The ring 500 is centered by horizontal rollers 503 turnable on the bearings 501 and bearing against its inner surface 504. These rollers 503 are preferably provided with flanges 505 for preventing the ring 500 from moving upward. The ring 500 is provided with a number (here twenty) of vertical bosses 511, in each of which a stud 509 can be inserted and secured by means of a set-screw engaging in a hole 513. The stud may be prevented from turning in any known manner, for example by means of a pin 515 engaging in its longitudinal groove 514. The upper end of the stud 509 is set off and engages in a lug 508 of a transporting vessel 200, which is prevented from turning on the stud 509 by a set-screw 510 and a pin engaging in the longitudinal groove. In this manner all the transporting vessels are made detachable, so that they can be exchanged for other transporting vessels. Therefore the machine can be used for various sizes of the packets, the transporting vessels 200 fitting the desired size of packets being selected and put on the several studs 509. Each transporting vessel 200 is open not only above and below, but also on the outer side. The ring 500 has fastened on its outer side brackets 516, in which the spindles 518 of movable bottoms 517 for the transporting vessels 200 are vertically adjustable, while they can be fastened by means of set-screws 519. The ring 500 is provided with an inner flange 533 at its upper edge, which flange has recesses 531 (Figs. 1 and 2) the number of which is equal to that of the transporting vessels 200.

In order to prevent the packets *c* from slipping off their supports 517 two superposed protecting strips 506ª and 506ᵇ (Figs. 1, 7, 14) surround the series of transporting vessels 200 and extend from near the station I to near the station XVIII. They are secured on suitable supports (not shown in Fig. 1).

The table A is disposed on a frame B¹ (Figs. 2, 4, 14, 20) of any construction carrying brackets C¹, C², C³, C⁴, C⁵, C⁶, C⁷, C⁸, (Figs. 1 to 1ᵈ) in which main shafts H¹′, H²′, H³′, H⁴′ are mounted to turn. The main shaft H¹ is driven from some source (not shown) and drives the other main shafts H², H³, H⁴ by means of like bevel wheels K¹, K², K³, K⁴, K⁵, K⁶, so that all of these shafts make the same number of revolutions per minute.

On the frame B¹ is a pin 540 (Fig. 4), on which a lever 527 is mounted to rock. This lever is pivotally connected with a rod 541, which is adapted to be reciprocated from cam disks 542 (Fig. 1ᵈ) on the main shaft H² in a known manner. On the table A is fastened a support 545 (Figs. 1ᶜ and 4) carrying a horizontal guide 525, on which a slide 524 is mounted to move. On the slide 524 is fastened a pin 524ª (Fig. 4ª), on which a block 528 is made to rock, which is movable in the slot of the upper forked end of the lever 527. The slide 524 has an arm 523, on which a vertical pin 522 is fastened. A pawl 520 is mounted to rock on the pin 522 and its tooth 532 (Fig. 1ᶜ) is adapted to engage in any of the recesses 531 in the flange 533 of the ring 500. A roller 546 is disposed on the upper surface of the pawl 520 and a helical spring 530 surrounding the upper extension of the pin 522 serves for pressing the pawl 520 against the flange 533. On the table A is fastened a bearing 548 (Fig. 1ᵈ), in which a vertical shaft 549 carrying another pawl 542 is mounted to rock. The pawl 542 is also adapted to engage in any of the recesses 531 and its rear arm 547 has at the free end a cam surface 546ª, which is adapted to work with the roller 546 of the first pawl. The shaft 549 has below an arm 550, which is reciprocated from the main shaft H³ by means of a rod 551 in any known manner.

The ring 500 with all the transporting vessels 200 is to be moved intermittently in the following manner: Normally the pawl 552 engages in any recess 531 and thereby prevents the ring 500 from moving. At the proper moment by means of the parts 551, 550, 549 the pawl 552 is withdrawn from the respective recess 531, whereby the ring 500 is set at liberty and at the same time the cam surface 546ª on the rear arm 547 is moved into the path of the roller 546. Then the other pawl 520 is moved from left to right in Fig. 1ᶜ by means of the parts 541, 527, 528, 524ª, 524, 522, so that the tooth 532 of the pawl engaging in the respective recess 531 takes along with it the ring 500, until the roller 546 strikes the cam surface 546ª of the arm 547 and the pawl 552 is rocked, so that it engages in the opposite recess 531, while its rear arm 547 withdraws by the roller 546 the tooth 532 of the pawl 520 from the recess of the ring 500. This ring therefore stops, while the slide 524 is moved back from right to the left, so that as long as the roller 546 rolls on the cam surface 546ª the pawl 520 remains withdrawn, whereupon the roller 546 rolls off the arm 547 and the tooth 532 strikes and rides over the smooth inner side of the flange 533 until it engages in the next following recess 531 and the slide 524 stops. It will be seen, that during one complete revolution of the ring 500 each transporting vessel 200 is adapted to occupy a number (here twenty) of consecutive stations, which in Figs. 1 to 1ᵈ are marked I, II, ___XX. On the table A are disposed various devices, which I now proceed to describe one after the other.

At the right end in Fig. 1 is fastened on the table A a support 1ˣ, in which a shaft 236 (Figs. 1, 2, 3) is mounted to rock and has fastened on it a bent lever with two arms 237 and 238. The arm 237 is connected by means of a bent piece 234ª with a ladle 234 and the other arm 238 has a slot, in which a pin 461 can be adjusted. A rod 239 embraces with its upper end this pin 461 and can in any known manner (not shown) be so actuated from the shaft H² as to move the ladle 234 from its vertical position shown in Fig. 3 into the horizontal position shown in Fig. 2, and vice versa. The support 460 is connected with a vertical guide 245, in which a slide 244 can reciprocate. This slide is moved up and down by means of a rod 248 which is actuated in any known manner from the main shaft H² by means of a cam disk. The slide 244 is by means of an arm 243 and a part 9ᵇ rigidly connected with a pusher 9, which is adapted to strike from above against the upper edges of the packet and to push the latter into the transporting vessel 200 below. Two shafts 5ª and 5ᵇ in a common axis and facing one another are mounted to rock in the support 1ˣ and in the bearing 463. Their inner ends carry arms 7ª and 7ᵇ (Figs. 1, 2 and 3) and their outer ends two-armed levers 4ª and 4ᵇ. The upper ends of the arms 7ª and 7ᵇ are provided with adjustable feelers 8ª and 8ᵇ respectively, which are adapted to normally pass between two pairs of ribs 257, 258 on the underside of the pusher 9. The outer arms of the levers 4ª and 4ᵇ have pins 13 (Figs. 1, 2), which engage in slots 358 at the upper ends of two forked rods 2ª′ and 2ᵇ′. The rods 2ª′ and 2ᵇ′ are vertically reciprocated from the shaft H² in any known manner, for example by means of suitable cam disks (not shown) fastened on the shaft H², against the upper surfaces of which cam disks their rollers 3 are made to bear, while the rods 2ª′ and 2ᵇ′ are guided by the shaft H² engaging in their forked ends. The inner arms of the levers 4ª and 4ᵇ are pivotally connected with two vertical rods 6ª and 6ᵇ, which are guided in eyes 465ª and 465ᵇ respectively at the upper beam 3′ (Fig. 3) and have cranked ends 356ª and 356ᵇ as is clearly shown. Two weighing apparatus (not shown) of any known construction are disposed on the beam 3′ and are adapted to alternately weigh determined quantities of wares and to discharge them on being released in any known manner into two hoppers (not shown) from either of which the charge is delivered on station II through a common hopper (not shown) into the packet. The two weighing apparatus are to be alternately released by means of two rods 14ª and 14ᵇ fastened on two slides 12ª and 12ᵇ, which are horizontally guided in supports 354ª, 354ᵇ on the beam 3′ and carry at their inner ends by means of suitable parts two pins 454 and 455 respectively. On the two pins 454, 455 two bent locks 10ª and 10ᵇ are respectively mounted to rock, which engage with their pins 466ª, 466ᵇ in the slots of the cranks 356ª, 356ᵇ and terminate in teeth 252 and 253. Two bent levers 250ª and 250ᵇ are mounted to rock on pins 467ª and 467ᵇ at the beam 3′ and are pivotally connected with rods 251ª and 251ᵇ, which are to be reciprocated from the shaft H² in any known manner (not shown). The upper arms of the levers 250ª and 250ᵇ carry two pawls 11ª and 11ᵇ, which are adapted to move with their teeth 259 and 260 on the two slides 12ª and 12ᵇ and to periodically work with the lock teeth 252 and 253.

This device operates as follows: If the packets are required to be automatically inserted one after the other into the packing machine some known packet manufacturing machine will have to be erected near the new machine and to periodically push from its delivery side a widened packet into the ladle 234 then occupying its horizontal position (Figs. 1 and 2). At this moment the slide 244 (Fig. 3) with the pusher 9 and its ribs 257, 258 occupies its highest position. Thereupon the movable ladle 234 with the packet on it is turned upward into the vertical position shown at Fig. 3, so that the packet is delivered downward into the opposite vessel 200. Now the slide 244 is moved downward so that the pusher 9 eventually strikes the upper edges of the packet and pushes the latter into the right position in the respective vessel. Either the lever 7ª or the other lever 7ᵇ is now moved inward, so that its feeler 8ª or 8ᵇ strikes the upper edge of the packet, which bears against the end faces of the ribs 257, 258, whereby the lever 7ª or 7ᵇ is stopped in its motion, which is permitted by the pin 13 of the lever 4ª or 4ᵇ freely moving in the slot 358 of the arm 2ª′ or 2ᵇ′. In consequence of this also the rod 6ª or 6ᵇ is stopped at a point slightly below its upper position, so that the lock 10ª or 10ᵇ is but slightly lowered and its tooth 252 or 253 is struck by and taken along with the tooth 259 or 260 of the pawl 11ª or 11ᵇ, whereby the slide 12ª or 12ᵇ with the rod 14ª or 14ᵇ is shifted, so as to release the corresponding weighing machine, which then gradually discharges its weighed charge into the common hopper mentioned above, which discharges its contents if the transporting vessel 200 holding the packet has moved from the position I to II in Fig. 1. Should, however, from some cause the transporting vessel 200 in the position I contain no packet, the feeler 8ª or 8ᵇ would be permitted to freely pass between the ribs 257 or 258 at the pusher 9, so that the corresponding rod 6ª or 6ᵇ would not be stopped but move downward and withdraw the tooth 252 or 253 of its lock 10ª or 10ᵇ from the path of the tooth 259 or 260 of the pawl 11ᵃ or 11ᵇ and consequently the respective weighing apparatus is not released. In this manner the empty transporting vessel 200 will not be filled with wares on arriving in the position II and thus every waste of wares is prevented.

At the station II I provide a device for shaking the packet c from the side while it is being charged. This shaking device is illustrated in Figs. 5 and 6 and is constructed as follows: On the table A is fastened a support 53 carrying a horizontal guide 99, in which a slide 74 reciprocates. On a pin 98 fastened on the arm 107 of the support a bent lever 79 is mounted to rock, the upper arm of which carries a pin 79ᵃ with a rectangular block 106 rocking thereon. The block 106 engages between two lugs 105 on the slide 74 and as the lower arm of the lever 79 is reciprocated from the main shaft H² by means of a rod 54 in any known manner, the slide 74 can be periodically reciprocated. Fastened on the slide 74 is a rack 72 which meshes with a pinion 83 secured on a vertical shaft 13ᵈ that rocks in the support 53 and is prevented from longitudinal motion. A ratchet wheel 84 is fastened on the shaft 13ᵈ and thereby rigidly connected with the pinion 83. Loose on the shaft 13ᵈ above the ratchet wheel 84 are four gear wheels 69 (Fig. 1) which are rigidly connected with one another. The lowest gear wheel 69 carries on the under side a pin 75ᵃ, on which a spring-pressed pawl 75, 81 rocks. The support 53 carries two vertical pins 95 and 90, the pin 90 carrying four superposed loose bent levers 70, 96 and the pin 95 being connected by helical springs 94 with the arms 96 of the levers 70, 96. The arms 70 carry each a leaf spring 80 and all the leaf springs 80 are normally in close proximity of the packet c in the transporting vessel 200. The outer end of each arm 70 is provided with a tooth (Fig. 1), which is adapted to engage in the respective tooth space of the corresponding gear wheel 69 and thereby to stop all the wheels 69, in case the slide 74 is moved from right to left in Fig. 1, so that the spring-pressed pawl 75 rides over the backs of the teeth of the ratchet wheel 84. When the slide 74 is moved in the opposite direction, that is from left to right in Fig. 1, the ratchet wheel 84 will take along with it all the four gear wheels 69 in the direction of the arrow in Fig. 1 by means of the spring-pressed pawl 75, so that the teeth of the arms 70 ride over the backs of the teeth of the gear wheels 69 and set the leaf springs 80 to vibrate under the action of the helical springs 94. In other words the springs 80 will be repeatedly moved away from the packet c and then strike it, whereby the charge while being introduced into the packet is laterally shaken in a similar manner as the packet is by hand shaken with the fingers.

At the four following stations III, IV, V, VI the charged packet c is to be vertically shaken. For this purpose gripping devices (Figs. 1 and 6ᵃ) are provided on each of the stations III—VI, which seize the packet and strike it on the bottom 517 of the station in question. Each of these gripping devices, which are omitted in the illustration on stations III and IV, consists of the fixed jaws 19ᵃ, 19ᵇ and the movable jaws 22ᵃ, 22ᵇ. The fixed jaws 19ᵃ, 19ᵇ are secured to the supports 703′, which are connected with the bracket 722′. On each support 703′ is guided a slide 705′, which carries the movable jaws 22ᵃ, 22ᵇ, and which is held by the plate 706′. Plate 706′ and slide 705′ are each provided with an eye 730′, 731′, which eyes are connected with each other by means of a spring 732. The latter tends to pull the slide 705′ inward, that is, the movable jaws 22ᵃ, 22ᵇ against the fixed jaws 19ᵃ, 19ᵇ.

The bracket 722′ is fastened on a slide 734, which is guided and moved up and down in a slideway 721 of the bracket 735. The slide 734 is moved by means of a rod 724 which is pivoted on the shaft 61 and actuated in any known manner by means of the rod 729 from the main shaft H³ by a cam disk.

In order to move the slide 705′, the latter is provided with a roller 743, which in the upper position of the slide 705′ can engage with a fixed stop 747 and in the lower position of the slide 705′ with a movable stop 704. The fixed stops 747 are detachably fastened to the rail 748, which may also be removed from the slide-way 721 to the upper end of which it is secured. The movable stops 704′ are situated on a rail 707 of the slide 750, which can be moved backward and forward in the slide-way 751 of the bracket 752. For this purpose the slide 750 is provided with two lugs 708, 708 between which the link 709 of the bent lever 712′ or 712ᵃ engages.

In order to work all four gripping devices of the stations III—VI simultaneously, the bent levers 712′, 712ᵃ, which are secured to the turnable rods 760 and 760ᵃ respectively, are connected to each other by the rod 713. The rod 760ᵃ possesses at its lower end a crank 716, to which a rod 717′ is connected. The latter is actuated by the bent lever 719 which is pivoted on the shaft 61 and which is actuated by the rod 720 in any known manner from the main shaft H³ by a cam disk.

The shaking device operates as follows: When the packet reaches one of the stations III—VI, the bracket 722′ is raised so high that the upper edge of the packet may pass freely under the grippers comprising the jaws 19ª, 22ª and 19ᵇ, 22ᵇ. These grippers are open by the rail 707 with the stops 704', being moved by the moving device described for the slide 750 so far forward that the jaws 22ª, 22ᵇ are separated from the jaws 19ª, 19ᵇ. Then the bracket 722' is lowered until the upper edge of the packet is within the said jaws. Then the latter are closed, by the rail 707, with the stops 704', being moved back. After this, the bracket 722' is raised, the packet being lifted by the said jaws at the same time, until the roller 743 engages the stop 747. Consequently the slide 705' is moved to the right (Fig. 6ª), whereby the jaws 19ª, 22ª and 19ᵇ, 22ᵇ are opened, and the packet falls down on the plate 517. Then the bracket 722' again moves downward, so that the said jaws, after leaving the stop 747, at first close, but then are again opened above the edge of the packet by the fact that the rail 707 with the stop 704' is moved forward, so that the above described process begins again. The packet can be lifted several times on each station according to the special conditions.

The packet can be shaken by the device according to Fig. 6ª in a slightly different manner, namely in such a way that the packet which is raised by the jaws 19ª, 22ª, 19ᵇ, 22ᵇ is not allowed to fall down upon the bottom 517, but is struck against the bottom 517 by the said jaws. For this purpose it is merely necessary to remove the detachable rail 748 with the stops 747 and to regulate the movement of the rail 707 in such a manner that the stops 704' are only worked twice while the packet remains on one of the stations III—VI, namely, once when the upper edge of the packet is seized by the jaws on the arrival of the packet at the station in question, and the second time when it is released by the jaws on the packet being pushed forward to the next station. The device then works in the following manner:—

As described above the jaws 19ª, 22ª and 19ᵇ, 22ᵇ are open and are situated above the edge of the packet, when the packet reaches the station in question. Then the bracket 722' is lowered and the said jaws are closed, so that the packet is seized by the latter and lifted when the bracket 722' is raised. As the rail 748 with the stops 747 have been removed, the jaws do not open when the bracket 722' is in its raised position, and the packet is not released but is held fast by the jaws during the upward movement of the bracket 722' and as, in the present case, the rails 707 with the stops 704' are held fast outside the path of the roller 743, that is to say are drawn back, the packet is struck by the jaws on the plate 517. As described above this process can take place several times with each packet on each of the stations III—VI. It is also possible to remove the cam-stop 747 at one or more stations, so that the packet is shaken in a different manner on the stations III—VI, namely, once by being dropped and the other time by being struck on the bottom plate 517.

At the station VII a card, i. e. with advertisements, is to be introduced into the filled packet.

On the table A (Figs. 1ª, 7, 8) are fastened two suitable standards 71 and 50, and loose on the shaft 61 are two parallel levers 62 and 73, which are separately rocked from the main shaft H³ in any known manner by means of the rods 63 and 74ª respectively. The standard 71 is made in one with a vertical guide 70ª in which a slide 72ª is reciprocated from the lever 73. Fastened on the slide 72ª is an arm 69ª, the free end of which is adapted to clamp by means of a screw 67 the hollow spindle 76 of a piston 38ª. The upper end of the hollow spindle 76 is to be connected by a hose 76ª with some means for sucking air, such as an air-pump or the like, and some known mechanism operated from the main shaft H³ should be provided for periodically opening and closing the connection between the hollow spindle 76 and the air sucking means.

The standard 50 is made in one with a horizontal guide 53ª above, in which a slide 52 is movable. This slide is on its lower side provided with a recessed lug 55, which passes through a slot 65 in the guide 53ª. On a pin 59 fastened on the standard 50 a bent lever 57 is mounted to rock, the lower arm of which is pivotally connected with the lever 62 by means of a rod 60. The upper arm of the lever 57 carries at the upper end a roller 56, which engages in the recess of the lug 55, so that in this manner the slide 52 can be reciprocated from the main shaft H³. On the standard 50 is disposed a magazine 44ª, the parts of which can be made in a known manner to fit the cards. On the slide 52 is fastened a plate 51, which passes through the magazine and serves as a bottom for the same. On the plate 51 is fastened a thin plate 66 serving as an injector, which is made exchangeable and requires to be slightly thinner than the card. On the side facing the hollow spindle 76 the magazine 44ª is provided with a vertical adjusting screw 77, which engages a vertically guided retainer 78. By adjusting the screw 77 the slot beneath the retainer 78 can be made wider or narrower, so as to allow of one single, that is the lowest, card being ejected by the ejector 66, while the next higher cards in the magazine 44ª are retained by the retainer 78. On two opposite sides of the magazine 44ª are fastened two pins 85 in a common axis and a bow 84ª provided with a handle 89 (Fig. 1ª) and two cams 86 are made to rock on these two pins 85. On the inside of the magazine two opposite bars 79ª are vertically guided, which are provided at the lower end with lifters 78, 78 (Fig. 8) and at the upper end with pins passing through vertical slots in the walls and carrying without rollers 80ª. The rollers 80ª are adapted to roll over the cams 86. For the normal position of the bow 84ª shown in Fig. 7 the two lifters 78, 78 occupy their lowest position shown in Fig. 8, so that they are beneath the upper surface of the plate 51 and do not come in contact with the lowest card.

The device described operates as follows: Normally the slide 52 with the lug 55 occupies the outer extreme position indicated by the dotted lines in Fig. 7, so that the lowest card is on the plate 51 in front of the ejector 66. When the respective transporting vessel 200 with the filled packet c has arrived at the station VII, the slide 52 is moved from right to left in Fig. 7 by means of the parts 63, 62, 60, 57, 55, so that the ejector 66 ejects the lowest card from under the column in the magazine 44ª to its piece beneath the piston 38ª. At this moment the connection between the hollow spindle 76 and the air-sucking means is opened, so that the card is at once attracted upward and adheres to the piston 38ª, whereupon the slide 62 is moved back to its initial position, so that the ejector 66 withdraws from under the following lowest card, which then drops on the plate 51 and is ready for the next operation. Then the piston 38ª with the adhering card is lowered by means of the parts 74ª, 73, 72ª, 69ª, 76 to a point slightly above the upper surface of the charge in the bag c, whereupon the connection between the hollow spindle 76 and the air-sucking means is closed and a communication of the hollow spindle with the atmosphere is established. Then the piston 38ª is returned upward to the initial position while leaving behind the card in the packet. Where so preferred, the device may be so arranged, that the piston 38ª is pressed on the charge in the packet, either before or after releasing the card, so as to make the latter adhere to the charge.

In case no card is to be inserted in the packet c, it is only necessary to turn the bow 84ª by means of the handle 89 downward, so that the two cams 86 engage beneath the rollers 80ª and thereby raise the two lifters 78, 78 above the level of the ejector 66 and in consequence of this the two lifters 78, 78 lift the column of cards in the magazine 44ª. Then the ejector 66 will not strike any card, but will simply reciprocate with the plate 51 and the slide 52. At the stations IX, X, XI, XII, XIII the folding and gumming of the upper edges of the packets is to take place.

Figs. 9 to 12 illustrate the various steps of closing the packets in elevation and plan view. In Fig. 9 e denotes the card placed on the upper surface of the charge in the packet c, so that the upper parts of the packet projecting from the card require to be folded. First the upper part a is bent down (Fig. 10) and its two folds adjoining the two neighboring parts g g on the level of the card e and also the two inclined folds in the two parts g g are sharply folded. Then the part a is gummed in the rectangular hatched surface h. Next the opposite part b is bent down (Fig. 11) and its two folds in the plane of the card e, also the two other inclined folds in the two parts g g are sharply folded. Thereupon the part b is gummed in the rectangular hatched surface i. Finally the two opposite triangular flaps g g in Fig. 11 are one after the other folded as is shown at Fig. 12.

In case double packets (Fig. 13) consisting of an outer packet c and an inner packet d (made for example from card-board) are employed, the inner packet d being cut open in the four corners down to the plane of the card e as is shown, the method of closing them is as follows: First two opposite flaps k and n are folded and then the two other flaps l and m are folded, after which the upper parts of the outer packet c are folded and gummed as desscribed above with reference to Figs. 9 to 12.

At the station IX a device for folding the upper part a of the packet c is disposed in the vertical radial plane, the part a being bent in a direction toward the center of the machine. At the station XI a similar device for folding the upper part b of the packet is disposed in the vertical radial plane, the part b being bent in a direction from the center of the machine outward. The folding device at the station IX is illustrated in Figs. 1ª, 14, 14ª, 14ᵇ and the folding device at the station XI is shown only in Fig. 1ᵇ. It is to be noted, that the two folding devices are similar but are disposed in opposite directions. Each device is constructed as follows:

On the table A is fastened a standard 19 made in one with a horizontal guide 18 above, in which a slide 4 is guided. On the upper surface the slide 4 is provided with two lugs 20ª and 20ᵇ, between which a roller 6 engages. This roller is mounted to turn on a vertical pin 7¹ at the free end of an arm 7 (7ˣ for the station XI) fastened on a vertical shaft 10 (10ˣ for the station XI), which is mounted to rock in a bracket 19¹ on the standard 19 above and in the machine frame below. The lower end of the shaft 10 carries an arm 11, which is pivotally connected with the corresponding arm 11ª (Fig. 1ᵇ) of the shaft 10ˣ by means of a rod 9. The arm 11ª is made in one with another arm 11ᵇ, which is rocked from the main shaft H² in any known manner by means of a rod 12. It will be seen that in this manner the slides 4, 4 of the two folding devices are simultaneously reciprocated. On the slide 4 is fastened a support 104, in which a cross pin 3 is fastened by means of a set-screw or the like (not shown). On this pin 3 a forked lever 2 (Fig. 1$^a$) is mounted to rock, which has a rear arm 5 carrying a roller 13$^a$ that is adapted to roll on a cam plate 14 adjustably secured to the guide 18. A helical spring 16 surrounding an extension 17 of the pin 3 tends to press the roller 13$^a$ against the upper surface of the cam plate 14. On the forked lever 2 is fastened a folder 1, which is a plate provided with two triangular lugs 107 on the sides (see Fig. 14$^a$ that represents a vertical section through the line $z$—$z$ in Fig. 14), which lugs slightly project above the inclined edges of the parts $g$ in the upper part of Fig. 11. The forked lever 2 may be provided with two adjusting screws 2$^c$ for limiting its downward motion. In order to protect the card $e$ from being shifted during the folding a piston 43 is provided, which is pressed on the card $e$ during or before the folding. The folder 1 has therefore a piece cut out at 50$^a$ (Fig. 1$^a$), so as not to disturb the piston 43. The latter is at the lower end of a vertical rod 45 adjustably secured to an arm 46 of a vertical rod 47, which is guided in suitable supports (not shown) and passes through the table A. On the shaft 61 (Fig. 14) a bent lever 48 is loosely mounted, the upper arm of which engages with a roller at the free end between two lugs on a block 47$^a$ fastened at the lower end of the rod 47. The bent lever 48 is rocked from the main shaft H$^3$ in any known manner by means of a rod 49. The vertical rod 47 of the folding device at the station XI is to be coupled with the above mentioned rod 47 in any known manner (not shown), so that the pistons 43 of the two devices are simultaneously moved up and down.

Fastened on the table A is a support 34$^a$ (Fig. 14) carrying a bracket 34, on which a vertical guide 33 is fastened. A slide 31 embracing this guide is vertically movable and is provided with a bent arm 35 (Fig. 1$^a$), which is pivotally connected with a lever 38 by means of a rod 36 passing through the table A. The lever 38 is loose on the shaft 61 and has an arm 39, which is rocked from the main shaft H$^3$ in any known manner by means of a rod 40. The slide 31 is made in one with a horizontal guide 21, in which two opposite slides 15$^a$, 15$^b$ are guided. On these two slides two lateral folders 2$^a$, 2$^b$ are fastened, which may slightly project above the triangular lugs 107 of the folder 1 in its extreme position shown in Fig. 14. The two slides 15$^a$, 15$^b$ are provided on the left side in Fig. 14 with pins, which can play in suitable slots 24$^a$, 24$^b$ provided in the guide 21 and carry rollers 19$^{a\prime}$, 19$^{b\prime}$ respectively. Fastened on the guide 21 is a pin 21$^a$, on which a cam disk 23 can rock. The two slides 15$^a$, 15$^b$ are connected by a helical spring 22, which tends to draw said slides toward each other so that the two rollers 19$^{a\prime}$, 19$^{b\prime}$ bear from opposite sides against the cam disk 23. A lever 24 rigidly connected with the cam disk 23 carries a roller 25, which under the pressure of the spring 22 occupies a certain position (Fig. 1$^a$). A vertical shaft 28 is mounted to rock in the bracket 34 above and in the machine frame below. It carries at the upper end an arm 27, the long pendent extension 26 of which remains in contact with the roller 25. At the lower end the shaft 28 carries two opposite arms 29 and 29$^a$ for the device at the station IX, but only one arm 29$^b$ for the other device at the station XI. The two arms 29$^a$ and 29$^b$ (Figs. 1$^a$ and 1$^b$) are pivotally connected with one another by means of a rod 30 and the arm 29 is rocked from the main shaft H$^2$ in any known manner by means of the rod 31$^a$. It will be seen that in this manner the arms 27 of the two folding devices are simultaneously moved.

The folding device at the station IX operates as follows: When the transporting vessel 200 is about to move from the station VIII to the other one IX, the slide 31 is by the rod 36 held in the upper extreme position, so that the roller 25 is in contact with the upper end of the extension 26 of the arm 27 and the lateral folder 2$^b$ permits the upper edges of the packet $c$ to pass beneath it. At the same time the arm 27 has so turned the cam disk 23 by means of the parts 25, 24, that this cam disk moves the two lateral folders 2$^a$, 2$^b$ away from one another. Then on the transporting vessel 200 stopping at the station IX the piston 43 is lowered and pressed on the card $e$ and the slide 4 is moved forward from right to left in Fig. 14, so that the folder 1, which normally occupies an inclined position, strikes the part $a$ of the packet $c$ (Fig. 9) and folds it while being turned into the horizontal position shown in Fig. 14. About at the same time the slide 31 with the two lateral folders 2$^a$ and 2$^b$ is lowered and the arm 27 is turned back, so that under the action of the helical spring 22 the two lateral folders 2$^a$ and 2$^b$ strike the two parts $g$ $g$ and thus sharply fold the folds formed. Next the arm 27 is again turned so as to move the two lateral folders 2$^a$, 2$^b$ apart and the slide 31 with these folders is returned upward into the normal position, while the folder 1 is withdrawn and turned upward, whereupon the ring 500 is fed one pitch forward, so as to move the transporting vessel 200 with the packet from the station IX to the following station X. Here the folded part $a$ of the packet $c$ is to be gummed in the hatched surface $h$ (Fig. 10). This is effected by a device illustrated at Figs. 15 and 16 and to be hereinafter described.

Where so preferred, the inclined folded edges of the parts $g$ $g$ in Fig. 10 may be bent along a line parallel to the edge and at a small distance therefrom so as to enable the edges of the folded flaps $g$ $g$ (Fig. 12) to better come in close contact with the folded parts $a$ and $b$. For this purpose the two lateral folders $2^a$ and $2^b$ (Fig. 14) are provided on the inside with ledges $106^a$ (Fig. $14^b$), which are made to move over the inclined edges of the lugs 107 of the folder 1. In this case the inclined edges of the lugs 107 are a little beneath the inclined folded edges of the parts $g$ $g$ in Fig. 10, as is indicated by dotted lines in Fig. 14.

The gumming device shown at Figs. 15 and 16 is constructed as follows: On the table A is fastened a support $57^c$, on which a box $65^a$ containing liquid gum or other adhesive substance is placed. This box $65^a$ may be of any approved construction and contains a drum $63^a$ dipping in the liquid. The drum $63^a$ is driven by means of its shaft, a pulley 64 and a belt 110 from a pulley on the main shaft $H^4$. As is shown in Figs. $1^a$ and $1^b$ the shaft of the drum $63^a$ extends to the other device above the station XII and also carries the drum $63^a$ of this device. The support $57^c$ is shown to have a projection $57^d$, on which a vertical guide $61^a$ is fastened. On the guide $61^a$ a slide $60^a$ is movable, which can be reciprocated from the main shaft $H^4$ in any known manner by means of a rod $62^a$. The slide $60^a$ is made in one with a horizontal guide $53^b$, on which a slide $52^a$ is movable. On a pin $57^a$ (see also Fig. $1^b$) fastened in a bracket $57^b$ a bent lever $56^a$ is mounted to rock. The lower arm $56^a$ is rocked from the main shaft $H^4$ in any known manner by means of a rod 58 and the upper arm $56^a$ carries a long pin $55^a$ which is pivotally connected with the slides $52^a$ of the two devices above the station X and XII by means of rods 54. The slide $52^a$ of each device carries a brush $51^b$ or the like adapted to periodically come in contact with the drum $63^a$ and to transfer the adhesive substance from the drum $63^a$ to the folded part of the packet $c$. Preferably the guide 21 of the neighboring folding device (Fig. 14) is provided with a bent horizontal bar $68^a$ (Fig. $1^a$), in which the spindle $67^a$ of a forked holder $66^b$ is vertically adjustable.

The operation of the gumming device is obvious: Normally the brush $51^b$ or the like is a little above the drum $63^a$ and after the transporting vessel 200 with the packet has arrived at the station, the brush $51^b$ descends and receives from the drum $63^a$ a charge of adhesive substance. Then the slide $60^a$ with the guide 53 may be raised and the slide $52^b$ may be moved from right to left in Fig. 15, whereupon the slide $60^a$ may be lowered, so that the brush $51^b$ descends and applies its adhesive substance to the folded part $a$ of the packet (Fig. 10). Meanwhile the holder $66^b$ has been lowered by the guide 21 of the folding device (Fig. 14), so that it comes in contact with the folded part $a$ and prevents the latter from following the brush $51^b$ when again raised. The transporting vessel 200 with the gummed packet then shifts from the station X to the following one XI, where the part $b$ of the packet $c$ is folded (Fig. 11) by the folding device in a similar manner to that described above with reference to the station IX. Thereupon the transporting vessel 200 with the packet shifts from the station XI to the next station XII, where the folded part $b$ is gummed. Afterward the transporting vessel 200 shifts to the following station XIII, where the two opposite parts $g$ $g$ are folded (Fig. 12) by means of a device illustrated at Figs. 17 and 18. It is constructed as follows: On the table A is fastened a standard $78^a$, to which a vertical guide $77^a$ is secured. A slide $79^b$ is movable on this guide and has a bent arm $80^b$ (Fig. $1^b$), which is pivotally connected by means of a rod $81^a$ with the inner arm of a two armed lever $82^a$ that is loose on a pin $83^b$ secured in a support $83^c$ on the table A. The outer arm of the lever $82^a$ is rocked from the main shaft $H^1$ in any known manner by means of a rod $84^b$. The slide $79^b$ carries on an arm $a$ pin 73, on which a two-armed lever $72^b$ is mounted to rock. The lower arm of this lever carries a folder member $70^b$ and the upper arm a roller 75 adapted to roll on a cam piece $76^a$ fastened on the upper end of the guide $77^a$. A helical spring $74^b$ surrounding the pin 73 tends to press the roller 75 against the cam piece $76^a$.

Beneath the slide $79^b$ another slide 87 is movable on the guide $77^a$. It has a bent arm $80^b$ (Fig. $1^b$) which is pivotally connected by means of a rod with the inner arm of a two-armed lever $89^a$ loose on the already mentioned pin $83^b$. The outer arm of this lever is rocked from the main shaft $H^1$ by means of a rod $90^a$. The slide 87 has at the upper end a horizontal arm $86^a$ to which the permanently horizontal second folder member $71^b$ is secured. This folding device operates as follows: Normally the slide $79^b$ occupies its highest position, so that the two-armed lever $72^b$ is inclined and the folder $70^b$ moved outward permits the two upward projecting flaps $g$ $g$ (Fig. 11 above) to pass clear of it. The other slide 87 also occupies its highest position, but the folder $71^b$ is lower than the first folder $70^b$, so that it strikes the next flap $g$ (above in the plan view of Fig. 12) and bends it a little. Then the slide 79$^b$ is moved downward and the lever 72$^b$ is turned into its vertical position, so that the folder 70$^b$ striking the other flap $g$ (below in the plan view of Fig. 12) bends it and moves its point beneath that of the first flap $g$ whereby the second flap comes in contact with the gummed part $b$. Meanwhile the slide 87 has also been moved downward, so that the folder 71$^b$ folds the first flap $g$. Afterward the parts described are returned to their initial position and the transporting vessel 200 with the now closed packet $c$ moves from the station XIII to the following one XIV.

In case no card $e$ is to be inserted in any packet, but the upper parts $k$, $l$, $m$, $n$ of the inner packet $d$ (Fig. 13) in a double packet are to be folded, the device for inserting cards (Figs. 7 and 8) is removed from the machine and two folding devices shown at Figs. 20 and 21 are disposed above the two stations VII and VIII, as is illustrated in Fig. 19. These devices are constructed as follows: On the table A is disposed a standard 112 (Fig. 20) for the station VII and another standard 97 (Fig. 21) for the station VIII. On the standard 112 is fastened a vertical guide 98$^b$, on which a slide 91 is movable. This slide is pivotally connected with the outer arm of a two-armed lever 99$^b$ (Fig. 20) rocking on a pin 100$^a$ at the standard 112 and the inner arm of the lever 99$^b$ is pivotally connected by means of a rod 101$^a$ with the longer arm of a bent lever 102$^a$ loose on the shaft 61. The short arm of the lever 102$^a$ carries a roller 103$^a$ which is adapted to roll on the periphery of a cam disk 104$^a$ fastened on the main shaft H$^3$, and a spring lock 103$^x$ is employed for pressing the roller 103$^a$ against the cam disk 104$^a$, so that in this manner the slide 91 is vertically reciprocated. The slide 91 carries two parallel horizontal pins 92$^a$, 92$^b$ on which two grippers 93$^a$, 93$^b$, respectively, of slide 91$^a$ in Fig. 21 are mounted to rock. Fastened on the guide 98$^b$ is a block 97$^a$ carrying two parallel pins with rollers 96$^a$, 96$^b$ on them. The two grippers 93$^a$, 93$^b$ are provided with upper arms 95$^a$, 95$^b$ adapted to move on the two rollers 96$^a$, 96$^b$. Helical springs 94$^a$, 94$^b$ surrounding the two pins 92$^a$ 92$^b$ tend to press the upper arms 95$^a$, 95$^b$ against the two rollers 96$^a$, 96$^b$. For the normal position of the two grippers 93$^a$, 93$^b$ (see Fig. 21) the inner faces 116$^a$, 116$^b$ of the arms 95$^a$ 95$^b$ are inclined to the vertical, while lugs provided on their naves have inner faces 115$^a$, 115$^b$, which for the said normal position are vertical and parallel. The grippers 93$^a$, 93$^b$ then permit the upper edges of the parts $k$, $n$ (Fig. 13) to freely move beneath them, as Fig. 20 shows. When the slide 91 descends, first the two grippers 93$^a$, 93$^b$ maintain their spread position shown in Fig. 21, as long as the two rollers 94$^a$, 94$^b$ roll on the vertical faces 115$^a$, 115$^b$, but on these rollers rolling on the inner faces 116$^a$, 116$^b$, they will move the two arms 95$^a$, 95$^b$ apart, so that the two grippers 93$^a$, 93$^b$ gripping the parts $k$ $n$ will fold them while moving on their upper surfaces inward. Then the parts of the device described will return to their upper position and the transporting vessel 200 with the internally closed packet $c$ will shift from the station VII to the following one VIII.

The folding device above the station VIII and shown at Fig. 21 is in general similar to the preceding one and differs therefrom in that the vertical guide 98$^a$ is placed radially instead of tangentially as 98$^b$. It is evident, that when the rod 101$^b$ is raised from the main shaft H$^3$, the lever 99$^a$ will move the slide 91$^a$ downward on the guide 98$^a$ fastened on the standard 97, so that the two grippers 93$^a$, 93$^b$ will grip the other two parts $l$ $m$ of the packet (Fig. 13) and fold them down. Then the transporting vessel 200 will shift from the position VIII to the next station IX, whereupon the packet will undergo the consecutive folding and gumming operations described above.

On leaving the station XIII the closed packet $c$ will pass beneath a segment 700 of sheet metal, which is attached to a suitable support 701 on the table A and serves for pressing the folded and gummed flaps of the packet. The segment 700 extends from near the station XIII· to the station XVI. In this manner the folded and gummed flaps of the packet are prevented from reopening.

On station XVI a closing label is applied to the top of every packet by means of the following device shown at Figs. 4 and 22–24. On the table A is fastened a support 484$^c$ to which a magazine 97$^c$ for closing labels is attached. The labels are in any known manner fed upward by means of a piston 98$^c$ as they are taken off above, the piston 98$^c$ being connected with a rod 98$^d$ which is guided in the slide-way 98$^e$ of a support 484$^d$ and gradually moved upward by any known means not shown. The support 484$^c$ is made in one with a guide 91$^c$ for a slide 89$^c$, which latter is to be reciprocated by means of a rod 90$^c$ which is actuated from the shaft H$^1$ in any known manner by a cam disk. For this purpose the slide 89$^c$ is provided with lugs 89$^d$, 89$^f$, between which a rocking lever 89$^g$ engages which is pivoted on the support 484$^c$ at 89$^h$ and to which the rod 90$^c$ is pivotally connected at 89$^i$. At the upper end the slide 89$^c$ carries a pin 88$^c$, on which a piston 87$^c$ can turn. The piston 87$^c$ is rigidly connected by means of a nave 397$^c$ with a pinion 92$^a$, which is adapted to periodically mesh with a toothed segment 93$^c$ fastened on a shaft 94$^c$ rocking in the support 484$^c$. At the other end of the shaft 94$^c$ is fastened an arm 95$^c$, which is adjustably connected with a rod 96$^c$, that is pivotally connected with a bent lever 96ᵈ, adapted to rock at 295ᶜ and actuated by the rod 96ᵉ from the main shaft H¹ in any known manner. In the support 484ᶜ a two-armed lever 121ᶜ is mounted to rock at 89ʰ. The long arm of the lever 121ᶜ is pressed inwardly by a helical spring 404ᶜ and carries an adjustable rod 401ᶜ provided at the inner end with a feeler 120ᶜ, which is adapted to strike a side of the charged packet at station XV. The long arm of the lever 121ᶜ is further pivotally connected by means of the rod 125ᶜ with the lock 127ᶜ rocking at 126ᶜ. The slide 89ᶜ has a notch 405ᶜ, in which the lock 127ᶜ can engage. The short arm of the lever 121ᶜ carries a pin 402ᶜ, which engages in a slot 403ᶜ at the upper end of a rod 124ᶜ that is to be reciprocated in any known manner from the shaft H¹.

Fastened on the support 484ᶜ is a box 100ᶜ for liquid gum or other adhesive substance, in which a drum 99ᶜ dips that is driven from without by means of a pulley 294ᶜ (Fig. 1ᶜ). In the support 484ᶜ is guided an arm 106ᶜ provided with arms 103ᶜ which carry at their free ends a gumming or pasting roller 101ᶜ and is rigidly connected with a vertical rod 102ᶜ the lower end of which is pivotally connected with a bent lever 104ᶜ rocking on a pin 295ᶜ at the support 484ᵈ. The lever 104ᶜ is actuated by means of the rod 296ᶜ from the main shaft H¹ in any known manner.

The support 545 is made in one with a guide 83ᶜ for a slide 82ᶜ. The front end of the slide 82ᶜ is pivotally connected by means of a link 84ᶜ with a bent lever 85ᶜ rocking on the shaft 212ᶜ. The lever 85ᶜ is to be reciprocated on any known manner from the shaft H¹. The guide 83ᶜ carries a stop 111ᶜ for a purpose to be presently explained. The front end of the slide 82ᶜ is rigidly connected with the lower member 110ᶜ of a tongs or gripper 298ᶜ and carries a pin 301ᶜ, on which the other member 109ᶜ rocks. A spiral spring 109ᵈ surrounding the pin 301ᶜ tends to close the gripper 298ᶜ. The rear arm 81ᵈ of the movable member 109ᶜ is adapted to engage beneath the roller 111ᵈ of the stop 111ᶜ, whereby the gripper 298ᶜ is opened. The movable member 109ᶜ has moreover an upright arm carrying a roller 107ᶜ. A holder 486ᶜ (Fig. 4) is adjustably fastened at the upper end of the support 484ᶜ and has a slot, in which a two-armed detent 108ᶜ is mounted to rock on a pin 302ᶜ. The inner bent end of the holder 486ᶜ carries an adjusting screw 398ᶜ which bears against the upper arm of the detent 108ᶜ for limiting its turn. The detent 108ᶜ is beveled off at the lower end as is clearly shown and is to be held in its normal position shown either by its own weight or by a spring suitably disposed (not shown). An angular support 487ᶜ is adjustably secured on the holder 486ᶜ and serves for supporting the free end of the slide 82ᶜ with the gripper 298ᶜ.

Above the stations XVI and XVII are arranged pressers 70ᶜ of rubber or the like for pressing the label to the top of the packet to which it has been applied. The pressers 70ᶜ are secured to a cross piece 393ᶜ which is fastened to the tubular piece 393ᵈ (Fig. 22). The latter sits loose on the rod 711 but is prevented from turning by means of the lug 711ᶜ (Fig. 1ᶜ) which is guided with a hole on a guiding rod 712ᶜ attached to the table A. The tube 393ᵈ is bounded by collars 714ᶜ and 714ᵈ so that it must follow the upward and downward movements of the rod 711.

On the crosshead 393ᶜ above the position XVI in Fig. 1ᶜ an angular piece 400ᶜ is fastened for guiding two vertical spindles 421ᶜ and 304ᶜ. The spindle 304ᶜ has a thickened part 304ᵈ, which is guided in the crosshead 393ᶜ and in the elastic presser 70ᶜ and carries at the lower end a small presser 80ᶜ of rubber or the like. A helical spring 399ᶜ surrounding the spindle 304ᶜ between the part 304ᵈ and the upper arm 424ᶜ of the piece 400ᶜ serves for pressing the presser 80ᶜ downward, while a stop 401ᵐ limits the stroke. The spindle 421ᶜ is prevented from turning by a feather 423ᶜ engaging in a corresponding groove in the arm 424ᶜ. The spindle 421ᶜ is also guided in the crosshead 393ᶜ and carries at its lower end an angular stop 420ᶜ and has a loose collar 422ᶜ with a set screw. When the spindle 421ᶜ is at liberty, its own weight will press it downward with its collar 422ᶜ on the crosshead 393ᶜ. When in the device shown at Fig. 22 the rod 711 with the tube 393ᵈ and the crosshead 393ᶜ is lowered the stop 420ᶜ is adapted to strike the top of the packet in the transporting vessel 200 below and to be thereby raised until it strikes the cross head 393ᶜ.

The device described operates as follows: The lever 121ᶜ is by the rod 124ᶜ periodically lowered, so as to withdraw the feeler 120ᶜ from the path of the transporting vessels 200, 200 and to permit the latter to move on their race. When the transporting vessel 200 with the closed packet in consideration has arrived in the position XVI, the piston 87ᶜ occupies the position indicated by the dotted line c—d in Fig. 4, and the arms 103ᶜ with the roller 101ᶜ occupy its lowest position shown at Fig. 4, so that the drum 99ᶜ transfers liquid gum or other adhesive substance to the roller 101ᶜ. Now the lever 121ᶜ is by the rod 124ᶜ so turned as to move the rod 401ᶜ inwardly, so that the feeler 120ᶜ strikes the side of the packet and is thereby stopped, which is permitted by the slot 403ᶜ, so that the rod 124ᶜ can further rise without producing any damage. The lock 127ᶜ is prevented from engaging in the notch 405ᶜ of the slide 89ᶜ, as it is kept at a small distance off from the slide, so that the latter is at liberty to afterward descend. At the same time the parts 296ᶜ, 104ᶜ, 102ᶜ, 103ᶜ raise the roller 101ᶜ, so that the latter transfers its coat of liquid adhesive substance to the piston 87ᶜ, whereupon it again descends. The toothed segment 93ᶜ, which had meanwhile temporarily stopped, is by the rod 96ᶜ further turned, so as to turn the gummed piston 87ᶜ through an angle of 90° into its lowest position shown in Fig. 4. Then the piston is by the slide 89ᶜ, the lever 89ᵍ and the rod 90ᶜ lowered, so that its pinion 92ᶜ comes out of engagement with the toothed segment 93ᶜ and the piston itself strikes the uppermost label in the magazine 97ᶜ and transfers its adhesive substance to the label. Thereupon the slide 89ᶜ with the piston 87ᶜ is again raised and the piston carries with it the uppermost label adhering to it, and when its pinion 92 again meshes with the toothed segment 93ᶜ, the latter is by the rod 96ᶜ turned in the opposite direction, so as to turn the piston 87ᶜ with the label through an angle of 180° into a position indicated by the dotted line *a—b* in Fig. 4. Meanwhile the slide 82ᶜ has been moved forward by the parts 85ᶜ, 84ᶜ and the gripper 298ᶜ has been opened by the roller 107ᶜ of its movable member 109ᶜ striking against the detent 108ᶜ, but when the roller 107ᶜ turned backward leaves the detent 108ᶜ, the gripper 298ᶜ again closes, so that it grips the right edge of the label, since the lower member 110ᶜ had just engaged beneath this edge of the label, when the piston 87ᶜ was about to accomplish its upward turn. Now the toothed segment 93ᶜ is again turned, so as to turn the piston 87ᶜ through an angle of 90° from the position *a—b* to the other *c—d* and at the same time the slide 82ᶜ is withdrawn into the position shown in Fig. 4, so that the gripper 298ᶜ easily strips off the gummed or pasted label from the piston 87ᶜ and moves it over the top of the packet. Meanwhile the rod 711 (Fig. 22) has commenced to lower the tubular piece 393ᵈ with the crosshead 393ᶜ, so that the elastic presser 80ᶜ (Fig. 24) strikes the label and presses it on the top of the packet at the moment, that the gripper 298ᶜ is opened (Fig. 4) by the rear end 81ᵈ striking the roller 111ᵈ of stop 111ᶜ and being thereby depressed. As the crosshead 393ᶜ continues its downward stroke, the large presser 70ᶜ strikes and presses the label on the top of the packet and the stop 420ᶜ prevents the packet from shifting. In this manner the correct application of the closing label to the packet is insured.

When the crosshead 393ᶜ again rises and the transporting vessel 200 with the packet has shifted from the position XVI to XVII, all the operations described are repeated for applying a closing label to the next following packet, and when the crosshead 393ᶜ descends, its second presser 70ᶜ will once more press the label on the packet in consideration so as to insure its proper adhesion. Should no charged and folded packet happen to be in the transporting vessel 200, the consequence would be that the feeler 120ᶜ (Figs. 1, 4) would not be stopped but permitted to further move inwardly, so that the lock 127ᶜ would engage in the notch 405ᶜ of the slide 89ᶜ and prevent the latter from further moving downward. This is permitted by a suitable spring (not shown) inserted somewhere between the rod 90ᶜ and the shaft H¹. Then the piston 87ᶜ would remain at some distance from the uppermost label in the magazine 97ᶜ and could again move upward without taking any label with it. Thus every waste of labels and all disturbances in the machine are avoided.

When the transporting vessel 200 with the packet in consideration arrives in the position XVIII, the closing label on the packet may be expected to be safe, so that the packet can be discharged, which is effected by the following device shown at Figs. 1ᶜ, 1ᵈ and 22:

On the table A is fastened a guide 715 in which the rod 711 mentioned above can be turned and longitudinally moved. The shaft 711 carries an arm 714 terminating in a pendent slightly inclined plate 712, which serves as an ejector. On the machine frame is a pin 724, on which a bent lever 722 is mounted to rock, its lower arm being operated from the main shaft H² by means of a rod 725. The upper arm of the lever 722 has a globular end 726, which engages in a slot 727 of a block 723 serving as a bearing for the lower end of the shaft 711. Fastened on the shaft 711 above the lock 723 is an arm 703 carrying at the free end a globular roller 704. In the machine frame a vertical shaft 706 is mounted to rock, which carries two opposite arms 716, 716ᵃ, of which one is reciprocated from the main shaft H⁴ by means of a rod 717. The other arm 716 has at the free end a vertical grooved projection 705 of a U-shaped cross section, in the groove of which the roller 704 engages. This projection 705 is made so long as to remain in engagement with the roller 704 during the vertical motion of the shaft 711. All the transporting vessels 200 have in the upper part of their rear wall a slot (not shown), through which the ejector 712 can pass. Above the transporting vessel 200 two pressing plates 731 and 731ᵃ leaving between them a bent slot 730 concentric to the shaft 711 are fastened similar to the segment 700 for guiding the closed packet. Normally the ejector 712 occupies its highest position and the arm 714 occupies its extreme inner position, about as is shown in Figs. 1ᶜ and 1ᵈ. When the transporting vessel 200 with the packet has arrived at the station XVIII, the ejector 712 is first lowered by the parts 725, 722, 723, 711, 714 so as to engage behind the closed packet and then swung by the parts 717, 716ᵃ, 716, 705, 704, 703, 711, 714 so as to eject the packet from the vessel 200 to some conveying device, for example a conveying belt passing over a drum $q$, the ejector passing through the slot 730.

The machine for charging and closing packets can be varied in many respects without departing from the spirit of my invention:

I claim:

1. In a packing machine, in combination, a movable support; a plurality of packet transporting vessels carried by said support; feeding mechanism for said support to bring its transporting vessels successively to a plurality of stations; charging means comprising a ladle and actuating mechanism therefor located at one of said stations for introducing a packet into a transporting vessel at said station; and a piston and actuating means therefor coöperating with said ladle correctly to position the packet in said transporting vessel.

2. In a packing machine, in combination, a movable support; a plurality of packet transporting vessels, each adapted to receive a packet, carried by said support; feeding mechanism for said support to bring its packet transporting vessels successively to a plurality of stations; releasing means located at one of said stations for operating a packet filling device to cause it to charge a packet; actuating mechanism for said releasing means, and feeler means automatically to prevent the operation of said actuating mechanism in the event of no packet being contained in a transporting vessel, said feeler means comprising a pusher provided with depending fingers and adapted to be lowered into the packet inserted, and positively operated feelers adapted to pass through the openings between said fingers of the pusher and thereby disconnect the releasing means of the filling device from the actuating mechanism for said releasing means, in case no packet has been inserted.

3. In a packing machine, in combination, a movable support; a plurality of transporting vessels carried by said support and each adapted to receive a packet; feeding mechanism for said support; a shaft; a pinion on said shaft; a rack and means for actuating the latter to turn the pinion alternately in opposite directions; pawls mounted for swinging movement; leaf springs carried by said pawls; toothed wheels loosely mounted on the pinion shaft having their teeth engaged by said pawls; and connections between said toothed wheels and said pinion, comprising a ratchet wheel and spring pressed pawl whereby said toothed wheels are caused to turn with the pinion in one direction of movement of the latter only.

4. In a packing machine, in combination, a movable support; a plurality of transporting vessels each comprising a supporting plate, said vessels being carried by said support and each adapted to receive a packet; feeding mechanism for said support; packet seizing means; and actuating mechanism for said packet seizing means to cause the latter to seize the packet, raise it and then release it to cause it to drop upon the supporting plate.

5. In a packing machine, in combination, a movable support; a plurality of transporting vessels each comprising a supporting plate, said vessels being carried by said support and each adapted to receive a packet; feeding mechanism for said support; packet seizing means; and actuating mechanism for the latter constructed and arranged to cause said packet seizing means to seize the packet and raise and lower it so as to cause it to strike upon said supporting plate.

6. In a packing machine, in combination, a movable support; a plurality of transporting vessels each comprising a supporting plate, said vessels being carried by said support and each adapted to receive a packet; feeding mechanism for said support; gripper jaws adapted to grip the edge of the packet; yielding means for normally maintaining said gripper jaws closed; supporting means for said gripper jaws; means for imparting vertical movement to said supporting means to lower and raise said gripper jaws; and fixed operating means to coöperate with said gripper jaws to cause them to be opened at predetermined times in their downward and upward movement.

7. In a packing machine, in combination, a movable support; a plurality of transporting vessels carried by said support and each adapted to receive a packet; means to feed said support to bring its transporting vessels successively to a plurality of stations; means located at one of said stations for inserting a card in a packet, comprising a movable piston, means for causing said piston to seize a card, means for moving said piston to place the card above the open end of the packet, means to cause said piston to release the card so that it shall drop into the packet, and means to lower the piston to press the card down upon the contents of the packet.

8. In a packing machine, in combination, a movable support; a plurality of transporting vessels carried by said support and each adapted to receive a packet; feeding mechanism for said support; and packet closing means comprising means successively to fold two opposed upstanding flaps of the packet into horizontal position, and adhesive applying means including a plunger and actuating means therefor to cause it to apply adhesive to the upper surface of each of said folded flaps after it has been folded into horizontal position.

9. In a packing machine, in combination, a movable support; a plurality of transporting vessels carried by said support and each adapted to receive a packet; feeding mechanism for said support; packet closing means comprising a central folder and lateral creasing members; and actuating mechanism whereby said lateral creasing members are moved and actuated in a straight line and perpendicularly to the lateral faces of the central folder sharply to crease the folded edges of the packet.

10. In a packing machine, in combination, a movable support; a plurality of transporting vessels carried by said support and each adapted to receive a packet; feeding mechanism for said support; packet closing means comprising a central folder and lateral creasing members; and actuating mechanism whereby said lateral creasing members are moved and guided in a straight line and perpendicularly to the lateral faces of the central folder sharply to crease the folded edges of the packet, said lateral folders having off set inner faces so as to bend the edges of the folds of the packet over the corresponding edges of the central folder.

11. In a packing machine, in combination, a movable support; a plurality of transporting vessels carried by said support and each adapted to receive a packet; feeding mechanism for said support; packet closing means comprising a central folder and lateral creasing members; actuating mechanism whereby said lateral creasing members are moved and guided in a straight line and perpendicularly to the lateral faces of the central folder sharply to crease the folded edges of the packet; and presser means and means for pressing it down upon the card inserted in the packet to prevent said card from shifting during the folding operation.

12. In a packing machine, in combination, a movable support; a plurality of transporting vessels carried by said support and each adapted to receive a packet; a flap folding member; guiding means therefor; lateral creasing members; a vertically reciprocating slide carrying said lateral creasing members; means yieldingly to draw said lateral creasing members toward each other; and cam means for separating said lateral creasing members.

13. In a packing machine, in combination, a movable support; a plurality of transporting vessels carried by said support and each adapted to receive a packet; means for folding the upstanding flaps at the open end of the packet to close the latter; adhesive applying means comprising a member for applying adhesive to the upper surface of a flap, a horizontally movable slide carrying said adhesive applying member, a vertically reciprocating slide carrying said horizontally movable slide, mechanism for moving said horizontally movable slide in a horizontal plane first to position said adhesive applying member above said flap and mechanism for moving said vertically reciprocating slide vertically then to cause the adhesive member to apply adhesive to said flap.

14. In a packing machine, in combination, a movable support; a plurality of transporting vessels carried by said support and each adapted to receive a packet; means for folding down the upturned flaps at the open end of said packet for closing the latter; actuating means therefor; adhesive applying means for applying adhesive to the upper surface of a flap; actuating means to move said adhesive applying means into and out of operative position with relation to the flaps; and a downhold and actuating means therefor to move said downhold into contact with a folded flap to prevent said flap from following the adhesive applying means when the latte is removed therefrom.

15. In a packing machine, in combination, a movable support; a plurality of transporting vessels carried by said support and each adapted to receive a packet; means to close the packet after it has been filled by folding down the upturned flaps at the open end of the packet, said folding means comprising a folder member mounted for vertical and rocking movement with means for rocking and vertically moving said folder member, and a second horizontally extending folder member with means for imparting vertical movement to the latter, said folding members being adapted to fold opposed flaps of the packet.

16. In a packing machine, in combination, a movable support; a plurality of transporting vessels carried by said support and each adapted to receive a packet; a plurality of stations adjacent said support; flap folding means located at one of said stations; feeding mechanism to feed said support to bring a packet into·registration with the station provided with said folding means; said folding means comprising a folder mounted for rocking and vertical movement and a horizontal folder, said folders being adapted to fold opposed flaps of the packet; means normally to maintain said folders elevated, the rocking folder at such a height as will enable both flaps to pass beneath it as the packet is fed to said station and the horizontal folder at such a height that it is engaged by the first flap and partly folds the latter; and mechanism thereupon to lower both folders to cause the rocking folder to meet and fold the second flap beneath the first flap and thereafter the horizontal folder to complete the folding of the first flap.

17. In a packing machine, in combination, a movable support; a plurality of packet receptacles carried by said support; actuating mechanism for said support to move it to present said receptacles successively to a plurality of stations; means for introducing an empty packet into a receptacle, means for rendering operative packet loading mechanism to fill the packet, means for preventing operation of said last named means in the absence of a packet from the receptacle, means for closing a packet contained in said receptacle, and means for ejecting a packet from said receptacle, located at successive stations; and actuating mechanism automatically to operate said last named five means when a receptacle is presented to the corresponding station.

18. In a packing machine, in combination, a movable support; a plurality of packet receptacles carried by said support; actuating mechanism for said support to move it to present said receptacles successively to a plurality of stations; means for introducing an empty packet into a receptacle, means for rendering operative packet loading mechanism to fill the packet, means for preventing operation of said last named means in the absence of a packet from the receptacle, means for inserting a card in the packet, means for closing a packet contained in said receptacle, and means for ejecting a packet from said receptacle, located at successive stations; and actuating mechanism automatically to operate said last named six means when a receptacle is presented to the corresponding station.

19. In a packing machine, in combination, a movable support; a plurality of packet receptacles carried by said support; actuating mechanism for said support to move it to present said receptacles successively to a plurality of stations; means for introducing an empty packet into a receptacle, means for closing one of two opposed flaps of the four flaps at the open end of the packet, means for applying adhesive to the upper surface of said closed flap, means for closing the other of said two opposed flaps, means for applying adhesive to the upper surface thereof, means for closing the remaining two opposed flaps of the four flaps, and packet discharging means, located at successive stations; and mechanism automatically to actuate said last named seven means when a receptacle is presented to the corresponding station.

In testimony whereof, I affix my signature in the presence of two witnesses.

OTTO HESSER.

Witnesses:
FRIDA KLAIBER,
PAULINE KLAIBER.